United States Patent
Takahashi et al.

(10) Patent No.: US 12,160,608 B2
(45) Date of Patent: Dec. 3, 2024

(54) INFORMATION PROCESSING APPARATUS, INFORMATION PROCESSING METHOD, REPRODUCTION PROCESSING APPARATUS, AND REPRODUCTION PROCESSING METHOD

(71) Applicant: Sony Group Corporation, Tokyo (JP)

(72) Inventors: Ryohei Takahashi, Tokyo (JP); Mitsuhiro Hirabayashi, Tokyo (JP); Ohji Nakagami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 272 days.

(21) Appl. No.: 17/633,585

(22) PCT Filed: Aug. 28, 2020

(86) PCT No.: PCT/JP2020/032733
§ 371 (c)(1),
(2) Date: Feb. 8, 2022

(87) PCT Pub. No.: WO2021/049333
PCT Pub. Date: Mar. 18, 2021

(65) Prior Publication Data
US 2022/0312035 A1    Sep. 29, 2022

Related U.S. Application Data

(60) Provisional application No. 62/898,882, filed on Sep. 11, 2019.

(51) Int. Cl.
*H04N 19/124* (2014.01)
*H04N 19/597* (2014.01)
*H04N 19/70* (2014.01)

(52) U.S. Cl.
CPC ........... *H04N 19/597* (2014.11); *H04N 19/70* (2014.11)

(58) Field of Classification Search
CPC ...... H04N 19/597; H04N 19/70; H04N 19/30; G06T 9/40
See application file for complete search history.

(56) References Cited

U.S. PATENT DOCUMENTS 8,929,670 B2 * 1/2015 Uemori ............... H04N 19/85
                                                      382/236
10,424,083 B2 * 9/2019 Sinharoy ............... G06T 9/001
(Continued)

FOREIGN PATENT DOCUMENTS

CA      3090919 A1    8/2019
CN     105379256 A    3/2016
(Continued)

OTHER PUBLICATIONS

International Search Report and Written Opinion mailed on Oct. 20, 2020, received for PCT Application PCT/JP2020/032733, Filed on Aug. 28, 2020, 8 pages including English Translation.
"Information technology—Coding of audio-visual objects—Part 12: ISO base media file format, Technical Corrigendum 1", ISO/IEC 14496-12:2015, Dec. 2015, 281 pages.
(Continued)

*Primary Examiner* — Philip P. Dang
(74) *Attorney, Agent, or Firm* — XSENSUS LLP

(57) ABSTRACT

An information processing apparatus, information processing method, reproduction processing apparatus, and reproduction processing method, capable of providing a viewing experience that meets the viewer's requests. An encoding unit encodes point cloud data in such a way as to have a phased hierarchical structure corresponding to a level of detail (LoD) indicating a level of quality to generate a bitstream being constituted of a data region including one or more geometry slices. A metadata generation unit generates partial slice-specific information being used for specifying a correspondence of the LoD to a partial slice used as a partial
(Continued)

region corresponding to the LoD in the geometry slice. A file creation unit creates a file including the partial slice-specific information.

15 Claims, 39 Drawing Sheets

(56) References Cited

U.S. PATENT DOCUMENTS

| | | | | |
|---|---|---|---|---|
| 10,909,725 | B2* | 2/2021 | Mammou | H04N 19/597 |
| 10,909,726 | B2* | 2/2021 | Mammou | G06T 9/001 |
| 10,921,411 | B2* | 2/2021 | Paul | G01R 33/56383 |
| 10,939,129 | B2* | 3/2021 | Mammou | H04N 19/174 |
| 11,017,566 | B1* | 5/2021 | Tourapis | G06T 9/001 |
| 11,113,845 | B2* | 9/2021 | Tourapis | G06T 3/08 |
| 11,182,951 | B2* | 11/2021 | Linåker | G06T 15/506 |
| 11,202,098 | B2* | 12/2021 | Mammou | H04N 19/59 |
| 11,244,505 | B2* | 2/2022 | Elg | B29C 64/386 |
| 11,508,096 | B2* | 11/2022 | Kuma | H04N 19/167 |

FOREIGN PATENT DOCUMENTS

| | | |
|---|---|---|
| JP | 2004-185628 A | 7/2004 |
| WO | WO-2015012225 A1 | 1/2015 |
| WO | WO-2019012975 A1 | 1/2019 |
| WO | 2019/159956 A1 | 8/2019 |

OTHER PUBLICATIONS

3DG, "ISO/IEC CD 23090-9 Geometry-based Point Cloud", 2019, 107 pages.

Nakagami et al., "[G-PCC] CE13.15 Report on LoD Generation for Spatial Scalability", ISO/IEC JTC1/SC29/WG11 MPEG2016/m49043, Jul. 2019, 25 pages.

Aksu, "Technologies Under Consideration for Carriage of Point Cloud Data", ISO/IEC JTC1/SC29/WG11 MPEG2018/N18607, Jul. 2019, 66 pages.

"Matroska Media Container", Available Online at:https://www.matroska.org/index.html, Retrieved from Internet on Dec. 23, 2021, 2 pages.

"WebP Container Specification", Google Developers, Available Online at:https://developers.google.com/speed/webp/docs/riff_container, Retrieved from Internet on Dec. 22, 2021, 12 pages.

Iguchi et al., "Generation of Octree Model from Boundary Representation by Using Graphics Hardware", Forum on Information Technology, 2007, 6 pages.

"G-PCC codec description v4", MPEG Meeting; Jul. 8, 2019-Jul. 12, 2019; 3DG, Gothenburg; (Motion Pircture Expet Group or ISO/IEC JTC1/SC29/WG11), No. n18673 Sep. 6, 2019, XP030206833.

Ryohei Takahashi et al:"(38.1) [PCC-System] on Partial access metadata for G-PCC based on Lod", MPEG Meeting; Apr. 20, 2020-Apr. 24, 2020 Alpbach; (Motion Picture Expert Group or ISO/IEC JTC1/SC29/WG11), No. m53461, Apr. 15, 2020, XP030287000.

* cited by examiner

FIG.10

```
aligned(8) class SubsampleInformationBox extends FullBox('subs', Version, flags) {
    unsigned int(32) entry_conunt;
    int i,j;
    for ( i=0; i < entry_conut; i++) {       // TARGET sample
        unsigned int(32) sample_delta;
        unsigned int(16) subsample_count;    // NUMBER OF sub-sample
        if ( susample_count > 0) {
            for (j=0; j < subsample_count; j++) {
                if ( version == 1)
                {
                    unsinged int(32) subsample_size;    // SIZE OF sub-sample
                }
                eles
                {
                    unsinged int(16) subsample_size;    // SIZE OF sub-sample
                }
                unsinged int(8) subsample_priority;
                unsinged int(8) discardable;
                unsinged int(32) codec_specific_parameters;  // INFORMATION ON sub-sample DEFINED FOR EACH
CODING CODEC
            }
        }
    }
}
```
⌐32

```
unsigned int(16) depth;
unsigned int(16) reserved = 0;
```
⌐33

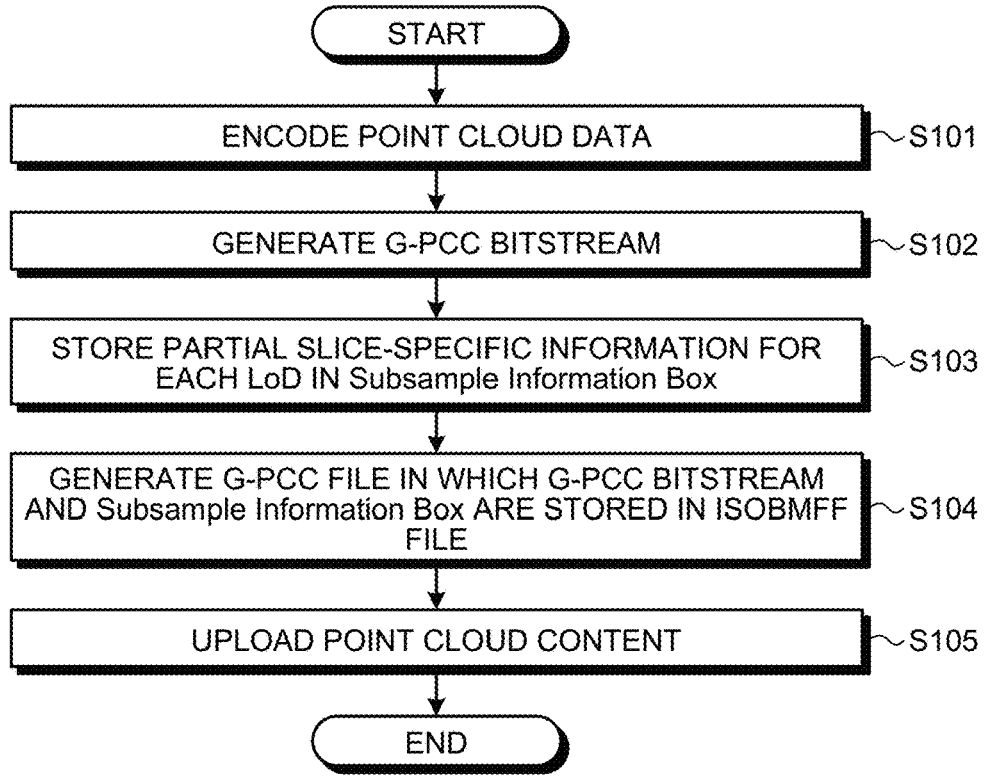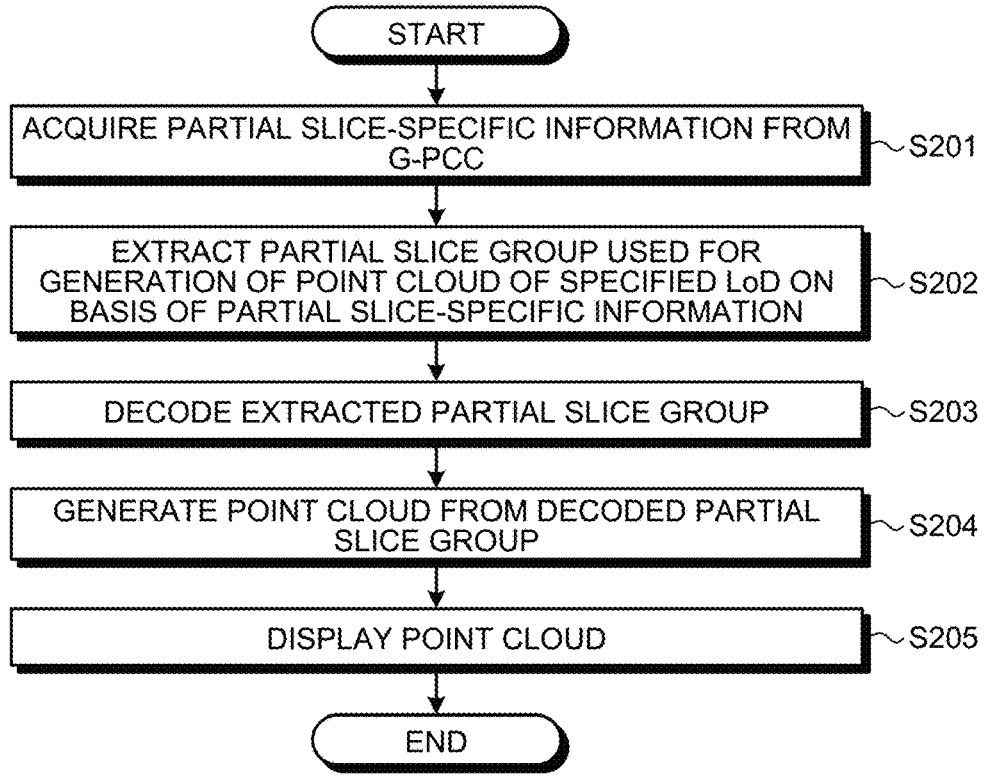

FIG.16

```
unsigned int(16) depth;
unsigned int(16) total_points;
```

```
aligned(8) class LoDDecodeSample() {
    unsigned int(32) entry_conunt;
    for ( i=0; i < entry_conut: i++) {
        unsigned int(16) lod;
        unsigned int(32) num_decode_entry;
        for ( j=0; j < num_decode_entry; j++) {
            unsigned int(32) unit_index;
            unsigned int(32) data_length_bytes;
            unsigned int(3) data_lengh_bits;
            unsigned int(5) reserved = 0;
        }
    }
}
```
36

FIG.20

```
                                                        ⌐39
unsigned int(8) PayloadType;
if (PayloadType == 4) { // attribute payload
        unsigned int(6) AttrIdx;
        bit(18) reserved = 0;
}
else
        bit(24) reserved = 0;
```

FIG.21

```
                                                        ⌐40
aligned(8) class LoDDecodeSample() {
    unsigned  int(32) entry_conunt;
    for ( i=0;  i < entry_conut:  i++) {
       unsigned  int(16)  lod;
       unsigned  int(16)  total_points;   ←―― 41
       unsigned  int(32)  num_decode_entry;
        for  (j=0;  j < num_decode_entry;  j++) {
            unsigned  int(32)  unit_index;
            unsigned  int(32)  data_length_bytes;
            unsigned  int(3)   data_lengh_bits;
            unsigned  int(5)   reserved = 0;
        }
    }
}
```

FIG.23

```
                                                    ⌐43
aligned(8)  class  LoDDecodeSample()  {
    unsigned  int(32) entry_conunt;
    for ( i=0;  i < entry_conut:  i++) {
        unsigned  int(16)  lod;
        unsigned  int(32)  num_decode_entry;
        for  ( j=0;  j < num_decode_entry;  j++) {
            unsigned  int(32)  unit_index;
        }
    }
}
```

FIG.25

```
                                                      ⌐44
aligned(8) class LoDDecodeSample() {
    unsigned int(32) entry_conunt;
    for ( i=0; i < entry_conut: i++) {
        unsigned int(16) lod;
        unsigned int(16) total_points;
        unsigned int(32) num_decode_entry;
        for ( j=0; j < num_decode_entry; j++) {
            unsigned int(32) unit_index;
            unsigned int(1) layer_flag;          ←~—45
            unsigned int(7) reserved = 0;
            if ( layer_flag) {
                unsigned int(32) num_unit;
            } eles {
            unsigned int(32) data_length_bytes;
            unsigned int(3) data_lengh_bits;
            unsigned int(5) reserved = 0;
            }
        }
    }
}
```

FIG.27

```
aligned(8) class UnitMapEntry extends
  VisualSampleGroupEntry ('unim', 0, 0) {
    unsigned int(16) entry_count;
    for (i=0; i<entry_count; i++) {
      unsigned int(32) unit_index;
      unsigned int(16) groupID;
      unsigned int(32) subs_entry_count;
      for(j=0; j<subs_entry_conunt; j++)
        unsigned int(32) subs_entry;
    }
}
```

FIG.30

```
aligned(8) class  TileLoDDecodeSample() {
    unsigned int(16) num_of_tiles;
    for (i=0; i<num_of_tiles; i++) {
        unsigned int(32) brick_offset_x;
        unsigned int(32) brick_offset_y;
        unsigned int(32) brick_offset_z;
        unsigned int(32) brick_size_x;
        unsigned int(32) brick_size_y;
        unsigned int(32) brick_size_z;

unsigned int(32)  entry_count;
        for (j=0; j<entry_conunt; j++) {
            unsigned int(16) lod;
            unsigned int(32) num_decode_entry;
            for (k=0; k<num_decode_entry; k++) {
                unsigned int(32) unit_index;
                unsigned int(32) data_length_bytes;
                unsigned int(3) data_length_bits;
                unsigned int(5) reserved = 0;
            }
        }
    }
}
```

FIG.32

```
aligned(8) class UnitMapEntry extends
  VisualSampleGroupEntry ('unim', 0, 0) {
    unsigned int(16) entry_count;
    for (i=0; i<entry_count; i++) {
      unsigned int(32) unit_index;
      unsigned int(16) groupID;
      unsigned int(16) depth;
    }
}
```

FIG.33

| unit_index=1 groupID=1 depth=0 | unit_index=2 groupID=1 depth=0 | unit_index=3 groupID=1 depth=1 | unit_index=4 groupID=1 depth=1 | | |
|---|---|---|---|---|---|
| geometry layer | attribute layer | geometry layer | attribute layer | geometry layer | attribute layer | ...

FIG.34

```
aligned(8) class BrickGroupEntry extends
VisualSampleGroupEntry ('blif', 0, 0) {
    unsigned int(16) gloup_id;
    unsigned int(16) lod;
    unsigned int(32) brick_offset_x;
    unsigned int(32) brick_offset_y;
    unsigned int(32) brick_offset_z;
    unsigned int(32) brick_size_x;
    unsigned int(32) brick_size_y;
    unsigned int(32) brick_size_z;
}
```

```
aligned(8) class UnitMapEntry extends VisualSampleGroupEntry ('unim', 0, 0) {
    unsigned int(16) entry_count;
    for (i=0; i<entry_count; i++) {
        unsigned int(32) unit_index;
        unsigned int(16) gloup_id;
    }
}
```

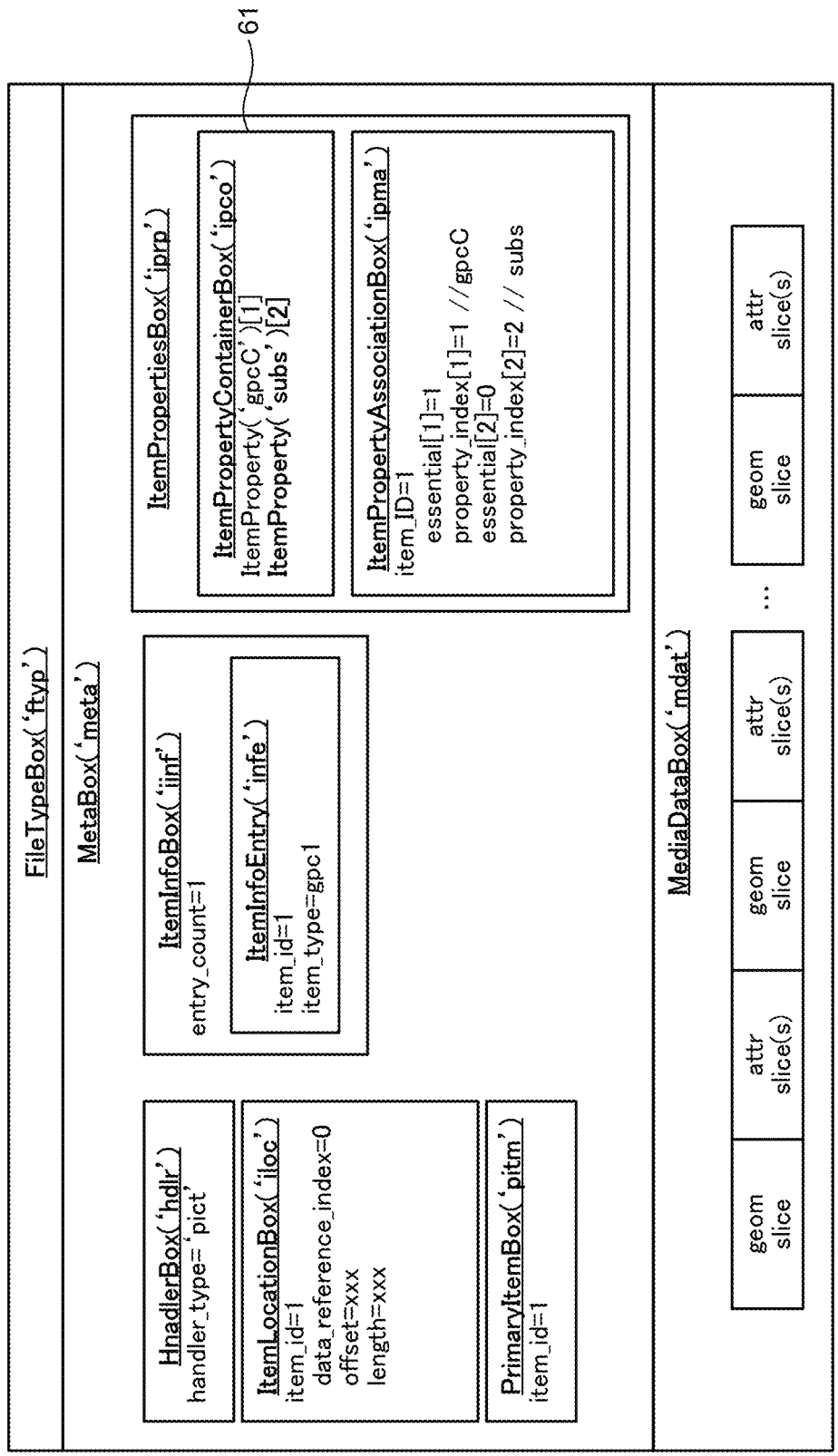

FIG.37

```
aligned(8) class SubSampleItemProperty extends ItemFullProperty('subs', Version, flags) {
    unsigned int(32) entry_conunt;
    int i,j;
    for ( i=0; i < entry_conut: i++) {
        unsigned int(32) sample_delta;
        unsigned int(16) subsample_count;
        if ( susample_count > 0 ) {
            for ( j=0; j < subsample_count; j++) {
                if ( version == 1)
                {
                    unsinged int(32) subsample_size;
                }
                eles
                {
                    unsinged int(16) subsample_size;
                }
                unsinged int(8) subsample_priority;
                unsinged int(8) discardable;
                unsinged int(32) codec_specific_parameters;
            }
        }
    }
}
```
⌐62

```
unsigned int(16) depth;
unsigned int(16) reserved = 0;
```
⌐63

FIG.39

```
                                                   ⌐65
aligned(8) class  LoDDecodeItemProperty extends
ItemFullProperty('ldec', version, flags) {
    unsigned int(32)  entry_count;
    for (i=0; i<entry_conunt; i++) {
        unsigned int(16) lod;
        unsigned int(32) num_decode_entry;
        for (j=0; j<num_decode_entry; j++) {
            unsigned int(32) unit_index;
            unsigned int(32) data_length_bytes;
            unsigned int(3) data_length_bits;
            unsigned int(5) reserved = 0;
        }
    }
}
```

FIG.41

```
                                              ⌐67
aligned(8) class  TileLoDDecodeItemProperty
extends ItemFullProperty('tlde', version, flags) {
    unsigned int(16) num_of_tiles;
    for (i=0; i<num_of_tiles; i++) {
        unsigned int(32) brick_offset_x;
        unsigned int(32) brick_offset_y;
        unsigned int(32) brick_offset_z;
        unsigned int(32) brick_size_x;
        unsigned int(32) brick_size_y;
        unsigned int(32) brick_size_z;

unsigned int(32)  entry_count;
        for (j=0; j<entry_conunt; j++) {
            unsigned int(16) lod;
            unsigned int(32) num_decode_entry;
            for (k=0; k<num_decode_entry; k++) {
                unsigned int(32) unit_index;
                unsigned int(32) data_length_bytes;
                unsigned int(3) data_length_bits;
                unsigned int(5) reserved = 0;
            }
        }
    }
}
```

INFORMATION PROCESSING APPARATUS, INFORMATION PROCESSING METHOD, REPRODUCTION PROCESSING APPARATUS, AND REPRODUCTION PROCESSING METHOD

CROSS-REFERENCE TO RELATED APPLICATIONS

The present application is based on PCT filing PCT/JP2020/032733, filed Aug. 28, 2020, which claims priority to U.S. Provisional Application No. 62/898,882, filed Sep. 11, 2019, the entire contents of each are incorporated herein by reference.

FIELD

The present invention relates to an information processing apparatus, an information processing method, a reproduction processing apparatus, and a reproduction processing method.

BACKGROUND

Moving picture experts group 4 (MPEG-4) is known as an international standardization technology for video compression. In addition, the international organization for standardization (ISO) base media file format (ISOBMFF) is a file container format of MPEG-4. In other words, it is possible to store video and audio data compressed using MPEG-4 in the ISOBMFF file for delivery.

Further, a method of employing a point cloud that is a set of points having both position information and attribute information such as color or reflection at the same time in a three-dimensional space is used as a method of expressing the three-dimensional space. This point cloud is related to encoding technology called geometry-based point cloud compression (G-PCC) that encodes the geometry indicating a three-dimensional shape and the attribute indicating the attribute information separately. This G-PCC is defined in MPEG-I geometry-based point cloud compression part 9 (ISO/IEC 23090-9). The encoded geometry data is called a geometry bitstream, and the compressed attribute data is called an attribute bitstream. The decoded geometry data is necessary to decode the attribute bitstream.

Further, a method is considered for storing the G-PCC bitstream in the ISOBMFF file for the purposes of reproduction processing from the local storage of the G-PCC bitstream which is the bitstream encoded by using the G-PCC and improving the delivery efficiency over a network.

Furthermore, the scalable encoding of Level of Detail (LoD), which is a hierarchical coding of image resolution, is supported in the codec layer as an octree for geometry and as an encoding option (scalable fix weight lifting) for attributes. Thus, decoding the geometry bitstream and the attribute bitstream can be interrupted at the desired LoD. It is possible to reconstruct and render point clouds at LoD lower than the LoD at the time of full decoding of the G-PCC bitstream.

CITATION LIST

Non Patent Literature

Non Patent Literature 1: ISO/IEC CD 23090-9:2019 Information technology. MPEG-I (Coded Representation of Immersive Media). Part 9: Geometry-based Point Cloud Compression, 2019-07-01

SUMMARY

Technical Problem

However, the proposed LoD scalable decoding technology necessitates the additional implementation of an LoD scalable decoding function for each decoder individually. The LoD scalable decoding depends on the implementation of a decoder as described above. Thus, some reproduction processing apparatuses are incapable of performing LoD scalable decoding in some cases. Accordingly, it is difficult to provide a viewing experience that meets the viewer's requests.

Thus, the present disclosure provides an information processing apparatus, information processing method, reproduction processing apparatus, and reproduction processing method, capable of providing a viewing experience that meets the viewer's requests.

Solution to Problem

According to the present disclosure, an encoding unit is configured to encode point cloud data in such a way as to have a phased hierarchical structure corresponding to a level of detail (LoD) indicating a level of quality to generate a bitstream constituted of a data region including one or more geometry slices. A metadata generation unit is configured to generate partial slice-specific information for specifying a correspondence of the LoD to a partial slice used as a partial region corresponding to the LoD in the geometry slice. A file creation unit is configured to create a file including the partial slice-specific information.

BRIEF DESCRIPTION OF DRAWINGS

FIG. 10 is a diagram illustrating SubSampleInformationBox according to the first embodiment.

FIG. 14 is a flowchart of file creation processing performed by the file creation device according to the first embodiment.

FIG. 15 is a flowchart of reproduction processing executed by the client device according to the first embodiment.

FIG. 16 is a diagram illustrating an example of codec_specific_parameters according to Modification (1) of the first embodiment.

FIG. 20 is a diagram illustrating an example of codec specific parameters according to Modification (2-1) of the first embodiment.

FIG. 21 is a diagram illustrating an example of timed metadata according to Modification (2-2) of the first embodiment.

FIG. 23 is a diagram illustrating an example of timed metadata according to Modification (3-2) of the first embodiment.

FIG. 25 is a diagram illustrating an example of timed metadata according to Modification (3-3) of the first embodiment.

FIG. 27 is a diagram illustrating an example of UnitMapEntry according to a second embodiment.

FIG. 30 is a diagram illustrating an example of timed metadata according to Modification (1) of the second embodiment.

FIG. 32 is a diagram illustrating UnitMapEntry when a depth value is stored in a sample group according to Modification (2-1) of the second embodiment.

FIG. 33 is a diagram illustrating a state of a sample group storing a depth value according to Modification (2-1) of the second embodiment.

FIG. 34 is a diagram illustrating timed metadata when a sample group is used according to Modification (2-2) of the second embodiment.

FIG. 36 is a diagram illustrating a method of storing a G-PCC still image in an ISOBMFF file.

FIG. 37 is a diagram illustrating an example of SubSampleItemProperty according to a third embodiment.

FIG. 39 is a diagram illustrating an example of the timed metadata according to Modification (1) of the third embodiment.

FIG. 41 is a diagram illustrating an example of TileLoDDecodeIntemProperty according to Modification (2) of the third embodiment.

DESCRIPTION OF EMBODIMENTS

Embodiments of information processing apparatus, reproduction processing apparatus, and information processing method disclosed herein are now described in detail with reference to the drawings. Moreover, the present technology includes not only the scope described in the embodiments but also the scope described in the non patent literatures mentioned below known upon filing.

Non Patent Literature 1: (same as described above)
Non Patent Literature 2: ISO/IEC 14496-12:2015 Information technology. Coding of audio-visual object. Part 12: ISO base media file format, 2015-12
Non Patent Literature 3: ISO/IEC M49043, [G-PCC] CE12.15 report on LoD generation for spatial scalability version 2, 2019-07-06
Non Patent Literature 4: ISO/IEC N18607, Technologies Under Consideration for Carriage of Point Cloud Data, 2019-08-26
Non Patent Literature 5: "Matroska Media Container", [Searched on Jun. 15, 2020], Internet <URL: https://www.matroscka.org/>
Non Patent Literature 6: "WebP Container Specification", [Searched on Jun. 15, 2020], Internet <URL: https://developers.google.com/speed/webp/docs/riff container>

In other words, the recitations disclosed in the non-literatures mentioned above are also the basis for judging the support requirements. For example, suppose the terms used in the File Structure disclosed in Non Patent Literatures 2 and 4 to 6 and the G-PCC bitstream structure disclosed in Non Patent Literatures 1 and 3 are not directly defined in the embodiments. Even in that case, they fall within the scope of disclosure of the present technology and should be construed as satisfying the support requirements of the claims. Similarly, technical terms such as parsing (parse), syntax, and semantics are also within the scope of the present technology even if there is no direct description in the embodiments, and they should be construed as satisfying the support requirements of the claims.

Further, the present disclosure will be described in the order of items listed below.

1. First Embodiment
    1.1 Modification (1) of First Embodiment
    1.2 Modification (2-1) of First Embodiment
    1.3 Modification (2-2) of First Embodiment
    1.4 Modification (2-3) of First Embodiment
    1.5 Modification (3-1) of First Embodiment
    1.6 Modification (3-2) of First Embodiment
    1.7 Modification (3-3) of First Embodiment 2. Second Embodiment
   2.1 Modification (1) of Second Embodiment
   2.2 Modification (2-1) of Second Embodiment
   2.3 Modification (2-2) of Second Embodiment
3. Third Embodiment
   3.1 Modification (1) of Third Embodiment
   3.2 Modification (2) of Third Embodiment
4. Fourth Embodiment 1. First Embodiment (Configuration of System according to First Embodiment)

Figure 1:
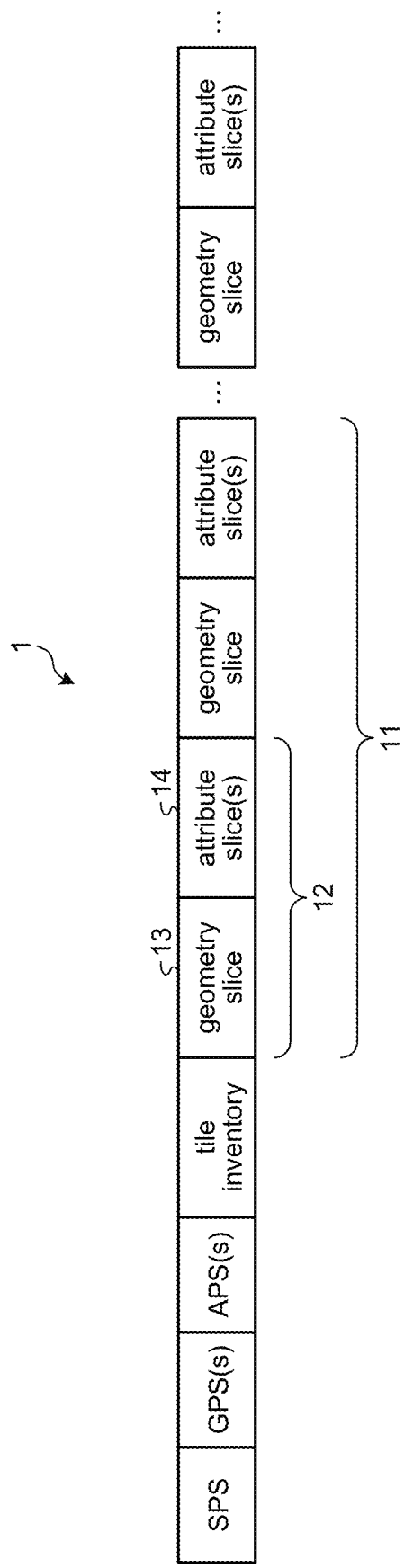
FIG. 1 is a diagram illustrating a structure of a G-PCC bitstream.
Figure 2:
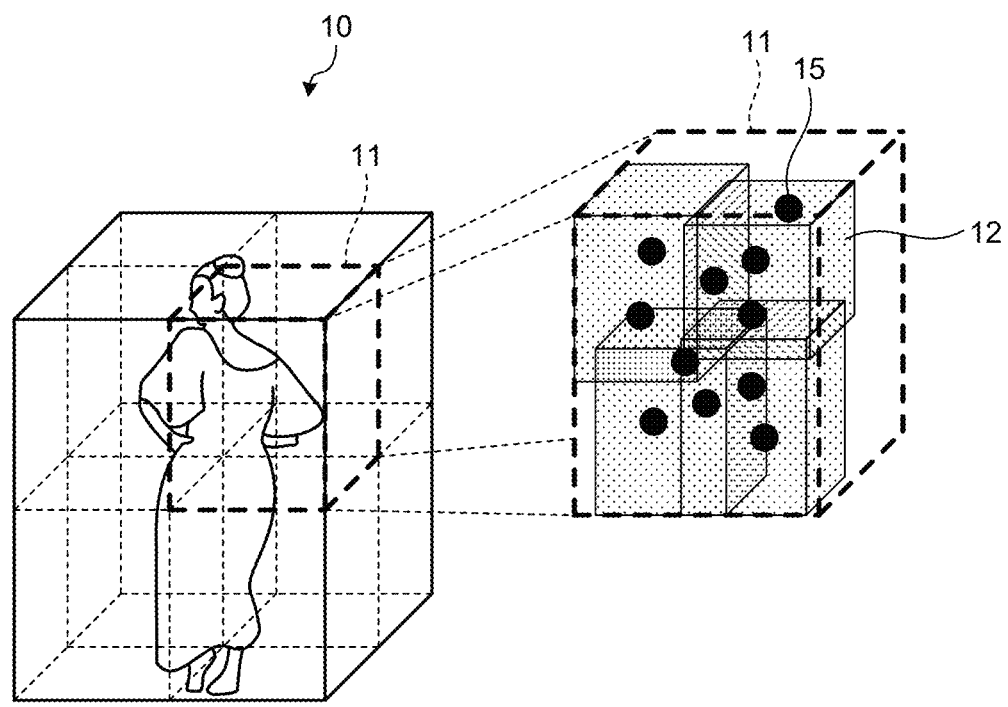
FIG. 2 is a diagram illustrating an image of one point cloud frame of a G-PCC bitstream.

FIG. 1 is a diagram illustrating a structure of a G-PCC bitstream. Further, FIG. 2 is a diagram illustrating an image of one point cloud frame of a G-PCC bitstream. The G-PCC bitstream 1 illustrated in FIG. 1 is a bitstream of a series of moving images in which point cloud frames 10 illustrated in FIG. 2 are arranged together.

As illustrated in FIG. 2, the point cloud frame 10 represents volumetric data formed of a plurality of points 15. In addition, the point cloud frame 10 includes a plurality of tiles 11. The tile 11 refers to one of the rectangular parallelepipeds obtained by dividing the bounding box of a solid surrounding one point cloud frame 10 into the rectangular parallelepipeds with the same shape. The tile 11 is a point cloud outer frame of the points 15 included in the point cloud frame 10. Then, the tiles 11 each include a plurality of slices 12. The slice 12 is a set of points 15 included in the tile 11. Then, the slices 12 each include one geometry slice 13 and zero or more attribute slices 14. Moreover, FIG. 2 illustrates an example of the case of having the attribute slice. There is one attribute slice 14 for each attribute. In the case where the slice 12 is a set of points having only position information and no attributes, the attribute slice 14 is not provided. On the other hand, in the case where the slice 12 is a set of points to which color or reflection is added, the attribute slice 14 is set for each attribute, such as color or reflection.

Figure 3:
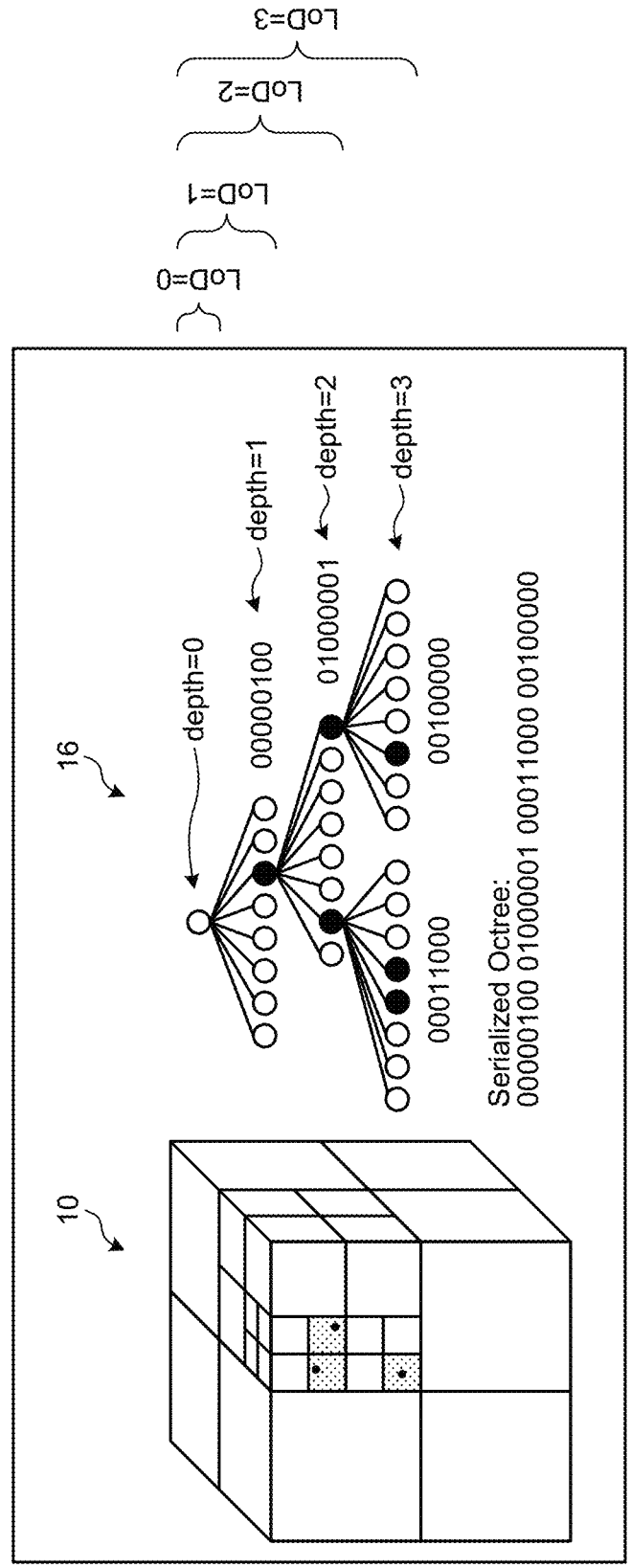
FIG. 3 is a diagram illustrating the octree coding of geometry.
Figure 6:
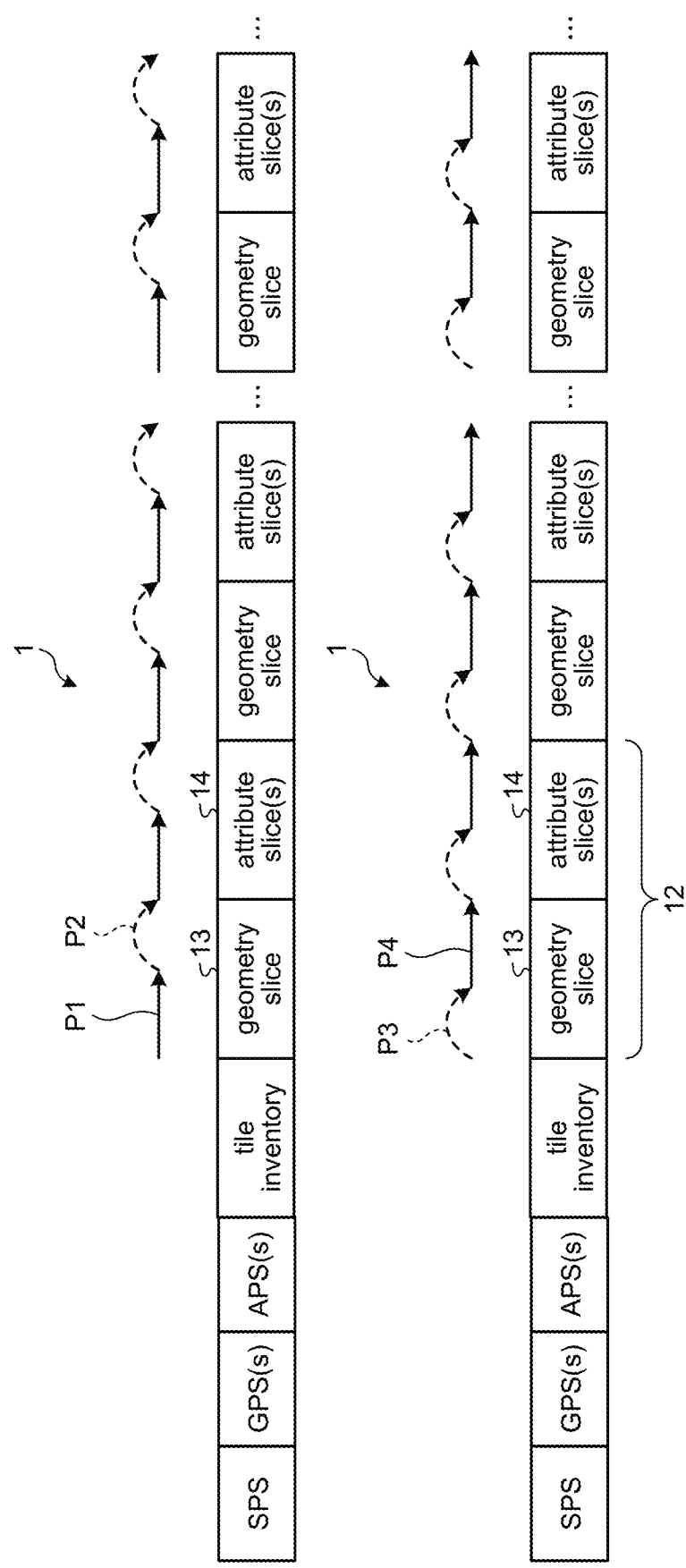
FIG. 6 is a diagram illustrating a processing example using a second method of LoD scalable decoding.

The octree coding illustrated in FIG. 3 is used to compress the geometry in the point cloud frame 10. FIG. 3 is a diagram illustrating the octree coding of geometry. The octree coding is a method of expressing the existence or absence of points in each block by an octree in the data expressed as a voxel. In the octree coding, as illustrated in the tree diagram in FIG. 6, the value of the block in which the point 15 exists is represented by 1, and the value of the block in which the point 15 does not exist is represented by 0. The hierarchy of each octree in the tree diagram in FIG. 6 is called the depth. There is a limitation that the deeper the depth, the smaller the spatial region indicating the existence of the point 15. Thus, for the geometry, the deeper the depth, the higher the image resolution and the definition. Then, the range representing the depth from the shallowest depth to reaching a certain depth corresponds to LoD. In other words, for example, in the case where there are layers of depth=0 to 3 illustrated in FIG. 3, the region of depth=0 corresponds to the region of LoD=0, and the region in which the layers of depth=0 and depth=1 are combined corresponds to the region of LoD=1. The region where the regions of depth=0 to 2 are combined corresponds to the region of LoD=2, and the region where the regions of depth=0 to 3 are combined corresponds to the region of LoD=3. In other words, it can be said that the image resolution and the definition is higher in stages as the LoD increases.

Further, the attribute is compressed using predicting weight lifting coding, region adaptive hierarchical transform (RAHT) coding, or fix weight lifting coding. Then, the attribute is the information about the attribute of a point and is set corresponding to the geometry, so that the attribute being set for the geometry on which the octree code is performed has a hierarchical structure similar to the geometry, and the image resolution and the definition is higher in stages as the LoD increases.

Referring back to FIG. 1, the description continues. The G-PCC bitstream 1 has the structure illustrated in FIG. 1. The G-PCC bitstream 1 has a sequence parameter set (SPS), a geometry parameter set (GPS), and an attribute parameter set (APS). The SPS stores basic information used to decode each bitstream. The GPS stores a parameter used to decode the geometry. The APS stores basic information used to decode the attribute. The GPS and the APS store an identifier (Id) of their corresponding SPS, and the identifier is associated with the SPS. The GPS and the APS can differ in units of the geometry slice 13 and in units of the attribute slice 14.

Further, the G-PCC bitstream 1 has a tile inventory, the geometry slice 13, and the attribute slice 14. The tile inventory includes the number of tiles 20 and the structure of the tiles 20. The tile inventory can differ for each point cloud frame 10.

Further, the slice 12 is a combination of the geometry slice 13 and the attribute slice 14 as described above. The slice 12 is independently decodable and can have overlapping points 15 between different slices 12. In addition, the tile 11 is an outer frame including a plurality of slices 12. The tile 11 can have overlapping regions between different tiles 11.

The geometry slice 13 holds gps_id, which is the identifier of the GPS, and is associated with the GPS through the gps_id. In addition, the geometry slice 13 holds tile_id, which is an identifier of the tile 11 to which the slice 12 formed by the relevant geometry slice 13 belongs, and is associated with the tile inventory through the tile_id. Furthermore, the geometry slice 13 holds slice_id, which is an identifier of the slice 12 formed by the relevant geometry slice 13. A series of geometry slices 13 forms the geometry bitstream.

The attribute slice 14 holds aps_id, which is an identifier of the APS, and is associated with the APS through the aps_id. In addition, the attribute slice 14 holds slice_id, which is an identifier of the slice 12 formed by the relevant attribute slice 14, and is associated with the geometry slice 13 through the slice_id. A series of attribute slices 14 forms the attribute bitstream.

Figure 4:
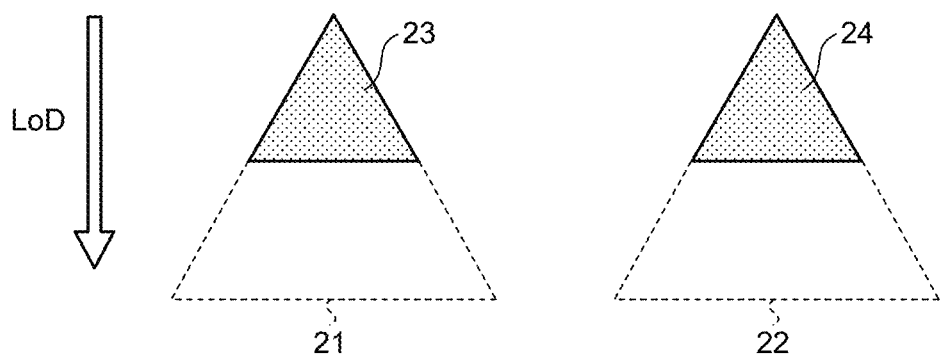
FIG. 4 is a diagram illustrated to describe LoD scalable coding.

Further, it is possible to decode the octree-coded geometry bitstream at the image resolution up to a predetermined layer. Furthermore, LoD scalable coding, which is usable for similarly performing decoding at the image resolution up to a predetermined layer, is also supported in the codec layer as an encoding option for the attribute. FIG. 4 is a diagram for describing LoD scalable coding.

As illustrated in FIG. 4, a geometry bitstream 21 and an attribute bitstream 22 have a structure that is layered according to the image resolution by the LoD scalable coding. The geometry bitstream 21 and the attribute bitstream 22 each have higher LoD from top to bottom toward the surface on the figure and increased density of data in an image to be displayed, increasing the image resolution.

The use of the LoD scalable coding to stop the decoding of the geometry slice 13 and the attribute slice 14 in the middle of the data, that is, in the middle of the hierarchy enables the point cloud frame 10 to be configured and rendered with the LoD corresponding to the desired hierarchy. Decoding expressing an image with high image resolution and high definition is hereinafter referred to as decoding at high LoD, and decoding expressing an image with low image resolution and low definition is referred to as decoding at low LoD. Then, decoding the G-PCC bitstream in which the attribute bitstream is encoded using the LoD scalable coding is referred to as LoD scalable decoding.

In other words, in the geometry bitstream 21, a partial geometry bitstream 23 corresponding to the low LoD portion is decoded at the low LoD, generating an image with a low image resolution. The partial geometry bitstream 23 is formed of partial slices that are parts of each geometry slice 13. In addition, the decoding at high LoD allows the entire geometry bitstream 21 to be decoded, for example, at the time of full decoding, generating an image with a high image resolution.

Similarly, in the attribute bitstream 22, a partial attribute bitstream 24 corresponding to the low LoD portion is decoded at the low LoD, generating an image with a low image resolution. The partial attribute bitstream 24 is formed of partial slices that are parts of each attribute slice 14. In addition, the decoding at high LoD allows the entire attribute bitstream 22 to be decoded, for example, upon decoding all the slices 12 included in the G-PCC bitstream 1, generating an image with a high image resolution.

In this regard, the description is given of a first method of decoding each slice 12 to the level of the desired LoD and a second method of additionally decoding the data at the remaining high LoD positions after the first method, as the processing method of LoD scalable decoding.

Figure 5:
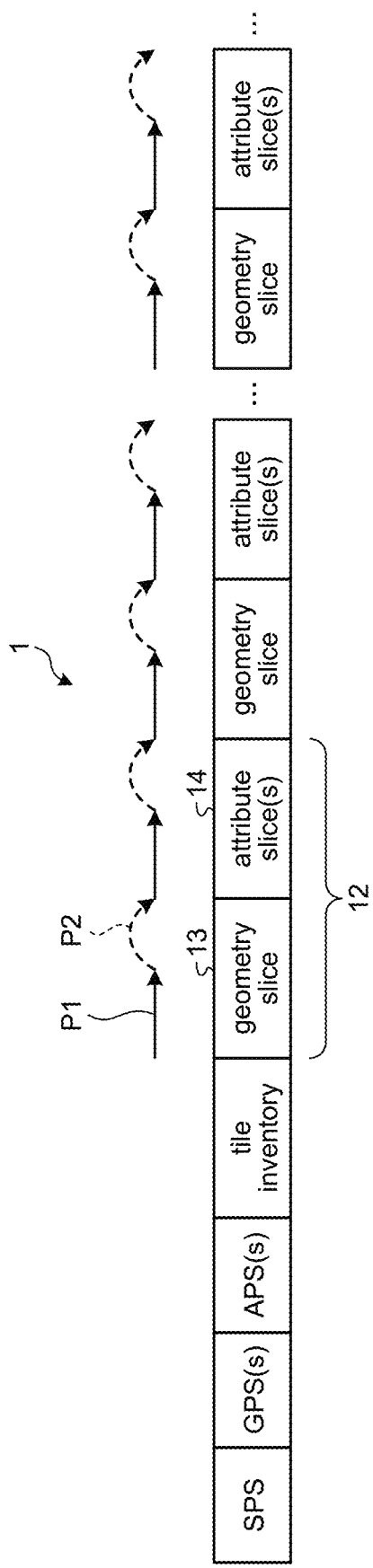
FIG. 5 is a diagram illustrating a processing example using a first method of LoD scalable decoding.

FIG. 5 is a diagram illustrating a processing example using a first method of LoD scalable decoding. In the first method, the decoder unconditionally decodes the SPS to the tile inventory in the G-PCC bitstream 1. Then, the decoder decodes the partial slices of the geometry slice 13 according to the desired LoD as illustrated in a process P1. After that, the decoder skips the rest as illustrated in a process P2 and decodes the next partial slice from the beginning of the next attribute slice 14.

FIG. 6 is a diagram illustrating a processing example using a second method of LoD scalable decoding. In the case of the second method, the decoder performs the decoding similar to the decoding performed in the first method, skips to the beginning of the remaining data as illustrated in a process P3, and decodes the remaining data as illustrated in a process P4. For example, after completion of the process P1 of the first method, it is possible to perform parallel processing so that the process P3 of the second method is performed at the same timing as the process P2 is performed. In addition, after completion of the processes P1 and P2 of the first method, it is also possible to perform parallel processing so that the process P3 of the second method is performed at the same timing as the process P1 for the attribute slice 14. Furthermore, it is also possible to perform the process P3 after processing all the slices. Moreover, the second method is used in the case where the side of the reproduction processing apparatus has sufficient resources and time.

However, the currently considered LoD scalable decoding technology necessitates the additional implementation of an LoD scalable decoding function for each decoder individually. In other words, in the first method for the LoD scalable decoding, the decoder is necessary to have a function of interrupting decoding at the desired LoD. In addition, in the second method for the LoD scalable decoding, the decoder is necessary to have a function of storing the completion position of decoding at the low LoD completed earlier and restarting the decoding at the high LoD from the completed position. This is because the decoding is performed at the high LoD.

In the case where an additional function is implemented for each decoder to achieve the LoD scalable decoding as described above, the LoD scalable decoding depends on the implementation of the decoder. Thus, some reproduction processing apparatuses are incapable of performing the LoD scalable decoding in some cases. Thus, it is difficult to provide a viewing experience that meets the viewer's requests.

For example, as a use case of the G-PCC bitstream 1, in the point cloud map data, the region near the viewpoint position is expected to be decoded and displayed at the high LoD and the region far away is decoded and displayed at the low LoD. The decoding and display in this case can also include progressive decoding that sequentially displays the reproducible images. In addition, as another use case, in movie production, upon using a virtual asset obtained by digitizing a real movie set, it is expected that the preview is decoded at the low LoD and the actual scene rendering is decoded at the high LoD.

It is preferable, to achieve such use cases, to perform, independently of the decoder, the LoD scalable decoding of the entire G-PCC bitstream 1 or perform the identification of the three-dimensional spatial position of tile 11 of G-PCC bitstream 1 and the LoD scalable decoding of each tile 11. Thus, the use of the information processing apparatus and the reproduction processing apparatus mentioned below allows the LoD scalable decoding independent of the decoder to be achieved.

Figure 7:
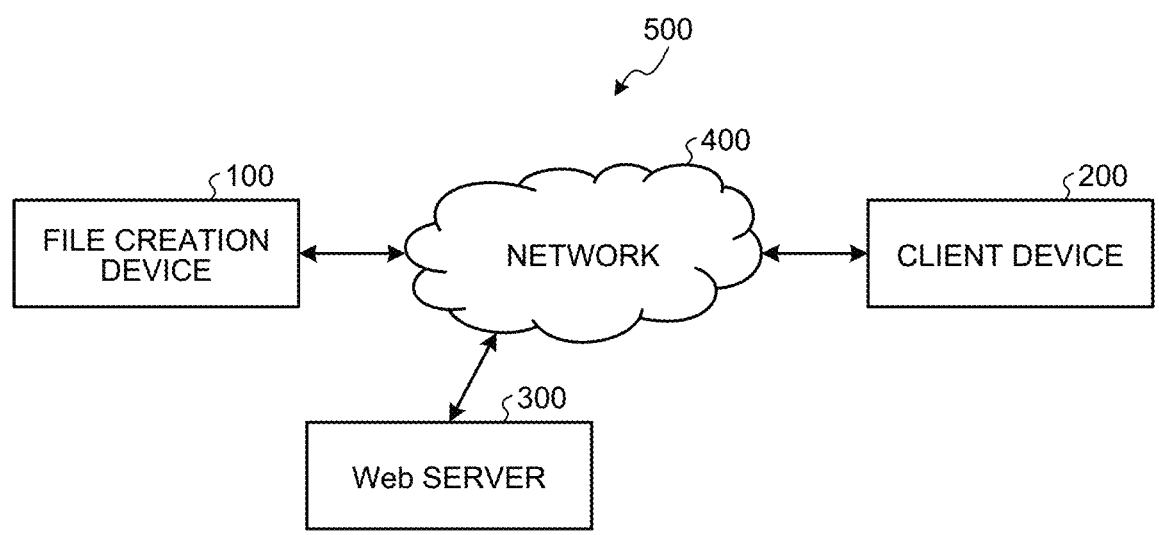
FIG. 7 is a diagram illustrating an exemplary system configuration of a delivery system.

FIG. 7 is a diagram illustrating an exemplary system configuration of a delivery system. A delivery system 500 includes a file creation device 100, a client device 200, and a web server 300. The file creation device 100 corresponds to the information processing apparatus, and the client device 200 corresponds to the reproduction processing apparatus. The file creation device 100, the client device 200, and the web server 300 are connected to a network 400. Then, the file creation device 100, the client device 200, and the web server 300 are capable of communicating with each other via the network 400. Although FIG. 7 illustrates each device as being provided only one of each, the delivery system 500 can include a plurality of file creation devices 100 or a plurality of client devices 200.

The file creation device 100 generates point cloud content, which is data used to provide a three-dimensional image with the point cloud. The point cloud content includes the G-PCC bitstream 1 or metadata. The file creation device 100 uploads the generated point cloud content to the web server 300. The description is given in the present embodiment of the configuration in which the web server 300 provides the point cloud content to the client device 200, but the delivery system 500 can employ another configuration. For example, the file creation device 100 can include the function of the web server 300, store the generated point cloud content in its own device, and provide it to the client device 200.

The web server 300 holds the point cloud content uploaded from the file creation device 100. Then, the web server 300 provides the point cloud content specified according to the request from the client device 200.

The client device 200 requests the web server 300 to transmit the point cloud content. After that, the client device 200 acquires the point cloud content specified in the transmission request from the web server 300. Then, the client device 200 decodes the G-PCC bitstream 1 included in the point cloud content to generate an image and causes a display device such as a monitor to display the image.

(Configuration of File Creation Device according to First Embodiment)

Figure 8:
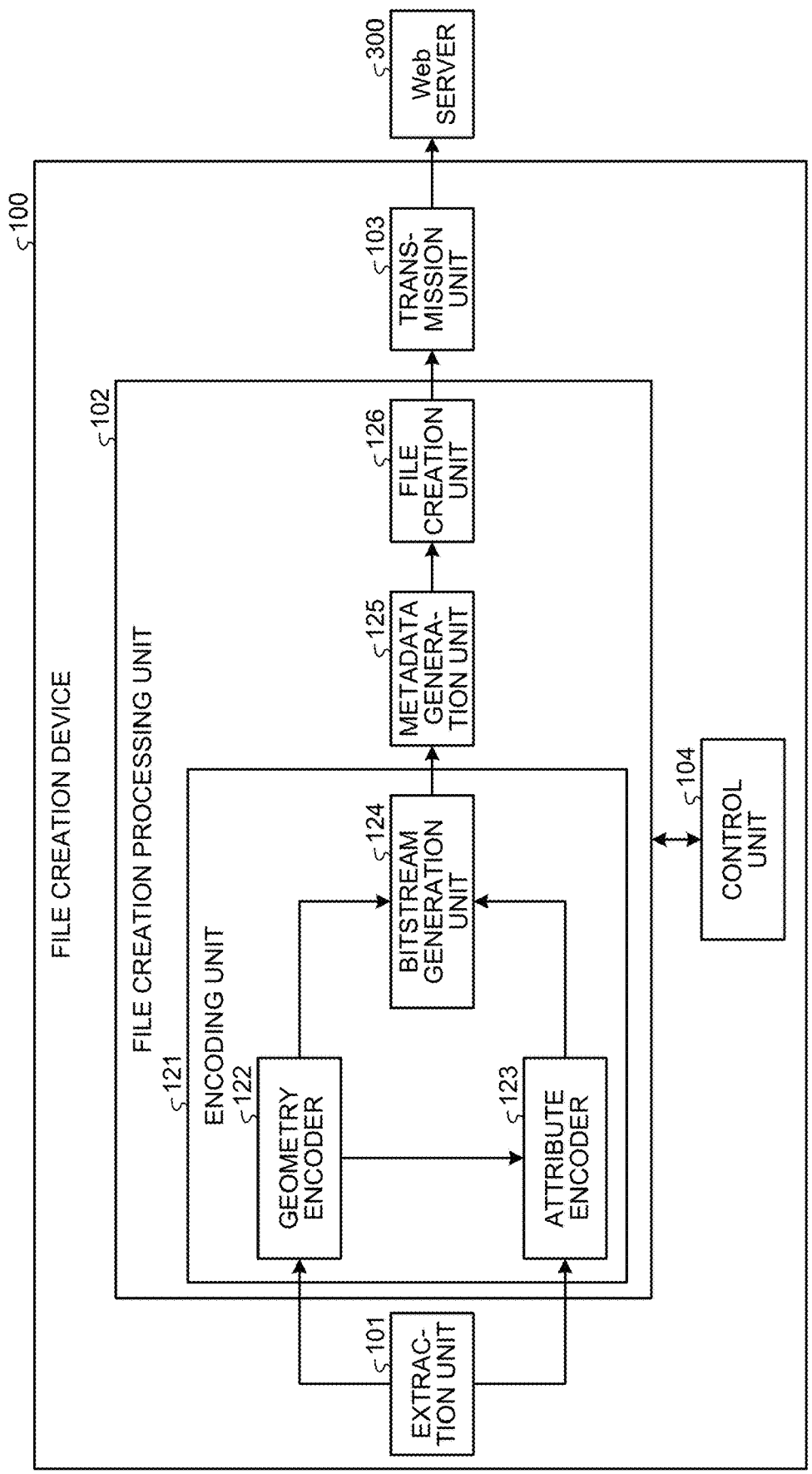
FIG. 8 is a block diagram of a file creation device.

The file creation device 100 is now described. FIG. 8 is a block diagram of a file creation device. The file creation device 100, which corresponds to the information processing apparatus, has an extraction unit 101, a file creation processing unit 102, a transmission unit 103, and a control unit 104, as illustrated in FIG. 8. The control unit 104 executes control-related processing of the file creation processing unit 102. For example, the control unit 104 performs overall control, such as operation timing of each component of the file creation processing unit 102.

The extraction unit 101 inputs the original data of the target point cloud content. The original data of the point cloud content includes control information used for generating the point cloud data and the metadata. The control information includes, for example, time control information about the point cloud data, information about a correspondence relation between geometry data and attribute data, and necessary parameters. The extraction unit 101 extracts the geometry data and the attribute data from the point cloud data included in the original data of the acquired point cloud content. Then, the extraction unit 101 outputs the geometry and attribute data and the control information to the file creation processing unit 102.

The file creation processing unit 102 has an encoding unit 121 and a file creation unit 126. Furthermore, the encoding unit 121 includes a geometry encoder 122, an attribute encoder 123, and a bitstream generation unit 124.

The geometry encoder 122 acquires the geometry data and the geometry-related control information output from the extraction unit 101. Then, the geometry encoder 122 performs encoding processing on the geometry data and uses the control information to generate a geometry slice in the point cloud content. In this case, the geometry encoder 122 performs the octree coding to generate a geometry slice with LoD. In addition, the geometry encoder 122 outputs each geometry slice and information regarding each coding parameter to the attribute encoder 123. Then, the geometry encoder 122 outputs each geometry slice forming the geometry bitstream, information regarding each coding parameter, and control information to the bitstream generation unit 124.

The attribute encoder 123 acquires the attribute data and the control information related to the attribute output from the extraction unit 101. Then, the attribute encoder 123 uses the control information and the information input from the geometry encoder 122 and performs encoding processing on the attribute data to generate the attribute slice 14 in the point cloud content. In this case, the attribute encoder 123 generates the information about the attribute slice having LoD corresponding to the geometry slice subjected to the octree coding and the information about the attribute slice indicating the correspondence relation with the attribute data. Then, the attribute encoder 123 outputs a plurality of attribute slices forming the attribute bitstream, information about each attribute slice, and control information to the bitstream generation unit 124.

The bitstream generation unit 124 inputs a plurality of geometry slices forming a geometry bitstream, information about each geometry slice, and control information from the geometry encoder 122. In addition, the bitstream generation unit 124 inputs a plurality of attribute slices forming the attribute bitstream and the control information from the attribute encoder 123.

Then, the bitstream generation unit 124 combines the geometry slices and the attribute slices that form a slice and arranges them in chronological order. Furthermore, the bitstream generation unit 124 generates SPS, GPS, APS, and tile inventory using the control information according to respective arranged slices. Subsequently, the bitstream generation unit 124 adds SPS, GPS, APS, and tile inventory to the data in which the geometry slice and the attribute slice are arranged to generate a G-PCC bitstream having the format illustrated in FIG. 1. After that, the bitstream generation unit 124 outputs the generated G-PCC bitstream and the control information to a metadata generation unit 125.

The metadata generation unit 125 inputs the G-PCC bitstream and the control information from the bitstream generation unit 124. Then, the metadata generation unit 125 generates depth information, which is hierarchical information indicating LoD and partial slices corresponding to LoD, for each geometry slice and attribute slice forming the G-PCC bitstream.

Then, the metadata generation unit 125 generates access information on access to the partial slices of the geometry slice and attribute slice corresponding to each LoD. Furthermore, the metadata generation unit 125 generates partial slice-specific information used to associate the hierarchical information with the access information. The generation of access information, hierarchical information, and partial slice-specific information by the metadata generation unit 125 is now described in detail.

The metadata generation unit 125 determines to store SPS, GPS, APS, and tile inventory in GPCCDecoderConfigurationRecord. However, the metadata generation unit 125 determines whether or not to include GPS, APS, and tile inventory depending on the type of sample entry.

Figure 9:
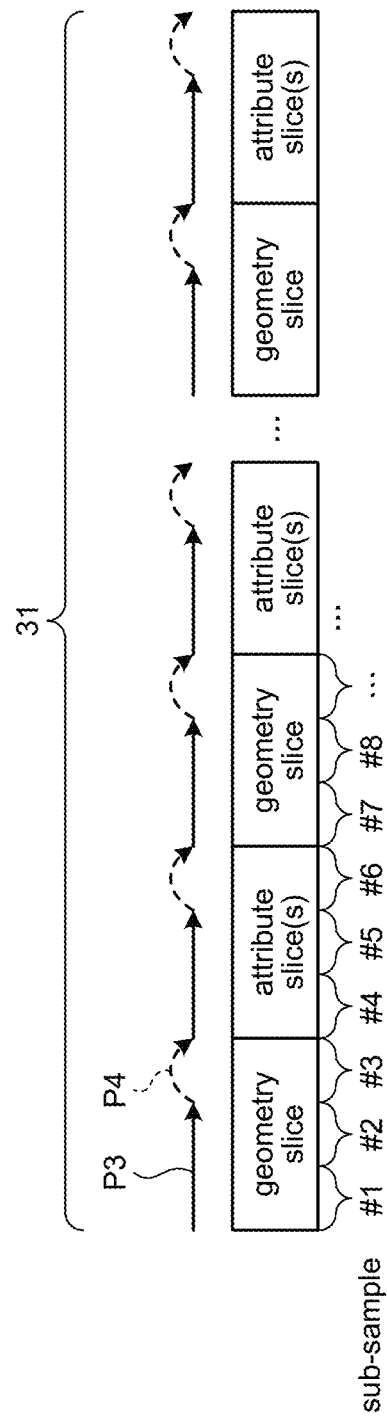
FIG. 9 is a diagram for describing access information and hierarchical information according to a first embodiment.

FIG. 9 is a diagram illustrated to describe access information and hierarchical information according to a first embodiment. The metadata generation unit 125 in FIG. 8 sets one or more geometry slices and zero or more attribute slices constituting one frame in the point cloud content as one sample and stores them in a track. For example, the metadata generation unit 125 stores each geometry slice and attribute slice included in one point cloud frame in one sample 31, as illustrated in FIG. 9.

Subsequently, the metadata generation unit 125 in FIG. 8 sets a sub-sample for each geometry slice and attribute slice on the basis of the depth information corresponding to LoD and generates partial slice-specific information indicating the correspondence to the LoD. Specifically, the metadata generation unit 125 divides each of the geometry slice and the attribute slice into a segmented slice for each depth and sets each segmented slice as a sub-sample, as illustrated in FIG. 9. Then, the metadata generation unit 125 generates partial slice-specific information indicating the correspondence relation between the partial slice formed by combining the segmented slices corresponding to the necessary depth and the LoD from the depth information corresponding to LoD.

In other words, the segmented slice corresponding to each depth is a region of difference that increases for each layer as the LoD is higher and the depth is deeper. In FIG. 9, sub-samples #1, #2, #3, and so on correspond to the respective segmented slices. For example, sub-sample #1 corresponds to a segmented slice that corresponds to the shallowest depth in the geometry slice. In addition, sub-sample #2 corresponds to a segmented slice corresponding to the second shallowest depth in the geometry slice. In other words, sub-sample #2 corresponds to the segmented slice corresponding to the difference between the lowest LoD and the next lowest LoD. In addition, sub-sample #3 corresponds to a segmented slice corresponding to the deepest depth in the geometry slice. In other words, sub-sample #3 corresponds to the segmented slice corresponding to the difference between the deepest LoD and the next deepest LoD. In addition, sub-sample #4 corresponds to a segmented slice corresponding to the shallowest depth in the attribute slice. In addition, sub-sample #5 corresponds to a segmented slice corresponding to the second shallowest depth in the attribute slice. In addition, sub-sample #6 corresponds to a segmented slice corresponding to the deepest depth in the attribute slice.

Subsequently, the metadata generation unit 125 in FIG. 8 sets size-related information on each segmented slice to be used as the information on access to the partial slice corresponding to each LoD. This enables the client device 200 to access the segmented slice corresponding to the specified LoD or skip other segmented slices by using the size information on the segmented slices. Specifically, the partial slice is formed from the segmented slices, so it is possible to access the partial slice corresponding to the specified LoD by combining the set partial slice-specific information and the size information on the segmented slice.

Further, the metadata generation unit 125 sets a depth value that is information representing the depth corresponding to each segmented slice upon dividing the slice. For example, the metadata generation unit 125 sets the depth value of sub-sample #1 to 0, sets the depth value of sub-sample #2 to 1, and sets the depth value of sub-sample #3 to 2 in FIG. 9. In addition, the metadata generation unit 125 sets the depth value of sub-sample #4 to 0, sets the depth value of sub-sample #5 to 1, and sets the depth value of sub-sample #6 to 2. The LoD exists for each geometry slice and each attribute slice, so the depth value in the present embodiment is assigned as a value starting from 0 from the header for each geometry slice and each attribute slice.

Then, the metadata generation unit 125 generates data to be stored in SubSampleInformationBox represented by syntax 32 illustrated in FIG. 10. FIG. 10 is a diagram illustrating SubSampleInformationBox according to the first embodiment. Each of the for-loops with a variable i in FIG. 10 corresponds to each sub-sample. Then, the metadata generation unit 125 represents the size of each sub-sample as subsample_size. In addition, the metadata generation unit 125 represents the depth value of the segmented slice represented by each sub-sample as codec_specific_parameters. The codec_specific_parameters is sab-sample information defined for each coding codec and is represented by syntax 33. Thus, the metadata generation unit 125 stores, in SubSampleInformationBox, the partial slice-specific information used to associate the size of the segmented slice that is the access information on the segmented slice with the depth value that is the hierarchical information. In other words, the metadata generation unit 125 stores the partial slice-specific information in the sub-sample Information. After that, the metadata generation unit 125 outputs the G-PCC bitstream 1 to the file creation unit 126. In addition, the metadata generation unit 125 outputs, to the file creation unit 126, the information about each storage destination of the SPS, GPS, APS, tile inventory, the geometry slice 13, and the attribute slice 14 and the metadata including SubSampleInformationBox.

In this regard, in the present embodiment, the metadata generation unit 125 stores SPS, GPS, APS, and tile inventory in GPCCDecoderConfigurationRecord and stores the geometry slice 13 and the attribute slice 14 in a sample of one track. However, this storage method is not limited to the description above, and for example, the metadata generation unit 125 can be configured to store the entirety or a part of SPS, GPS, APS, and tile inventory in the sample. The determination on whether GPS, APS, and tile inventory are stored in GPCCDecoderConfigurationRecord or are stored in the sample is performed depending on the type of the sample entry. In addition, the metadata generation unit 125 can be configured to store the geometry slice 13 and the attribute slice 14 in a sample of an individual track.

Figure 11:
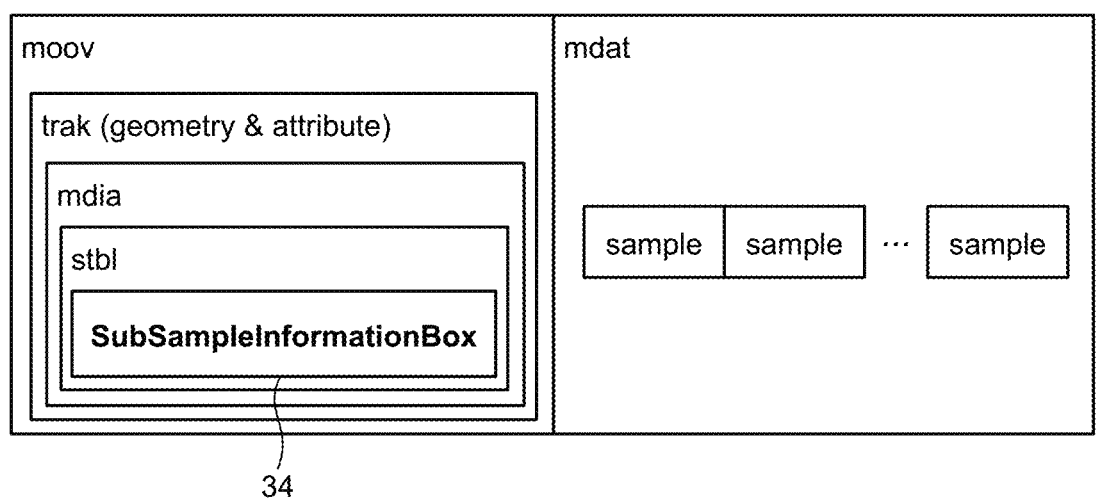
FIG. 11 is a diagram illustrating an example of storing SubSampleInformationBox according to the first embodiment.

The file creation unit 126 inputs the G-PCC bitstream 1, the information about the storage destination of each data, and the data to be stored in the SubSampleInformationBox from the metadata generation unit 125. Then, the file creation unit 126 stores the acquired metadata in the ISOMBFF file. For example, the file creation unit 125 stores the partial slice correspondence information for each LoD in the sub-sample information on ISOBMFF. Subsequently, the file creation unit 126 creates a G-PCC file in which the G-PCC bitstream 1 is stored in mdat, which is the actual data region of the ISOBMFF file, as illustrated in FIG. 11. FIG. 11 is a diagram illustrating an example of storing SubSampleInformationBox according to the first embodiment. Specifically, the file creation unit 126 stores the geometry slice 13 and the attribute slice 14 in a sample of one track. In addition, the file creation unit 126 stores the SPS, GPS, APS, and tile inventory in the GPCCDecoderConfigurationRecord. Furthermore, the file creation unit 126 stores the SubSampleInformationBox in a subordinate of a movie box, in the subordinate of a tack box, in the subordinate of a media box, and in the subordinate of a sample table box, as illustrated by a box 34 in FIG. 11. In FIG. 11, the movie box is represented as moov, the tack box is represented as trak, the media box is represented as media, and the sample table box is represented as stbl. In addition, the file creation unit 126 can store the SubSampleInformationBox in the subordinate of the track fragment box in the subordinate of the movie fragment box. After that, the file creation unit 126 outputs the created G-PCC file to the transmission unit 103.

The transmission unit 103 inputs the G-PCC file of the G-PCC bitstream 1 from the file creation unit 126. Then, the transmission unit 103 transmits the acquired G-PCC file of the G-PCC bitstream 1 to the web server 3 for uploading the point cloud content.

[Configuration of Client Device according to First Embodiment]

Figure 12:
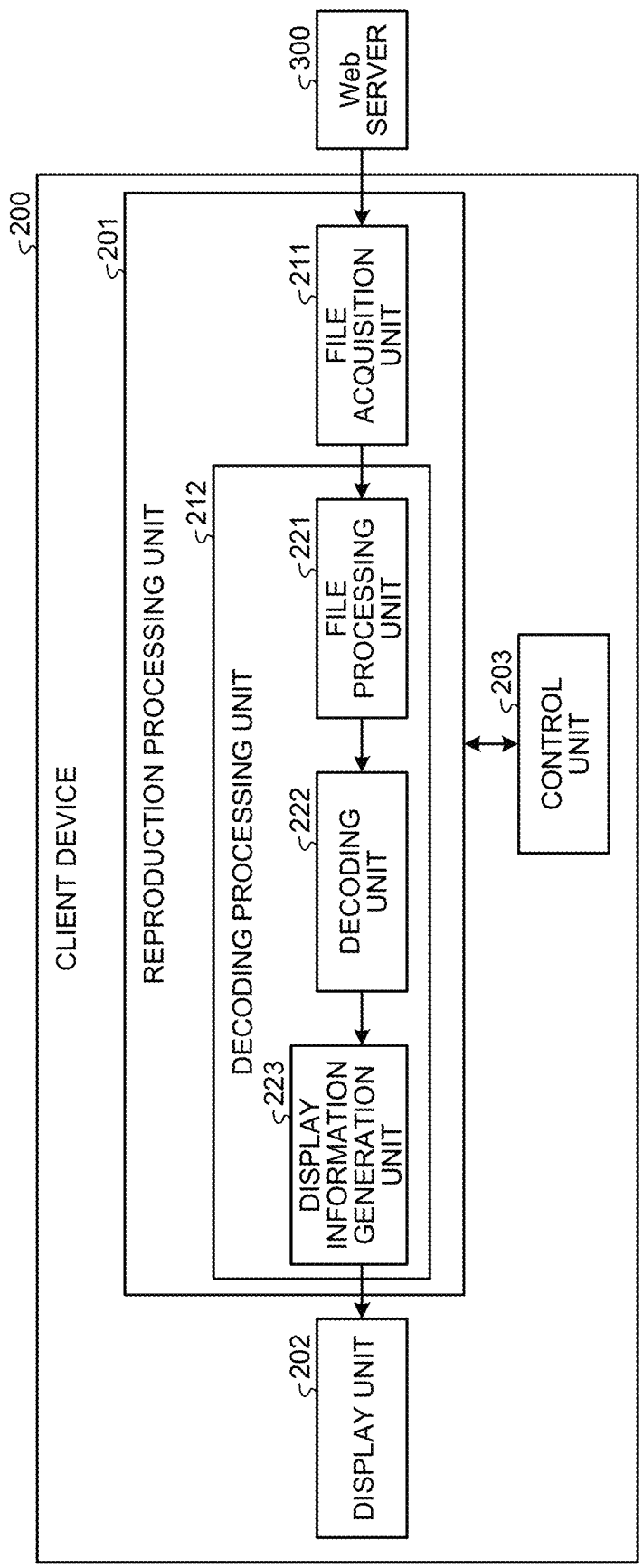
FIG. 12 is a block diagram of a client device.

FIG. 12 is a block diagram of a client device. As illustrated in FIG. 12, the client device 200, which corresponds to the reproduction processing apparatus, has a reproduction processing unit 201, a display unit 202, and a control unit 203. The control unit 203 controls the operation of each component of the reproduction processing unit 201. For example, the control unit 203 performs the overall control of the operation timing of each component of the reproduction processing unit 201. The reproduction processing unit 201 has a file acquisition unit 211 and a decoding processing unit 212.

The file acquisition unit 211 transmits a request to acquire point cloud content data to the web server 300.

Then, the file acquisition unit 211 acquires the ISOBMFF file in which the G-PCC file of the G-PCC bitstream 1 of the point cloud content is stored from the web server 300. After that, the file acquisition unit 211 outputs the acquired ISOBMFF file to the decoding processing unit 212.

Figure 13:
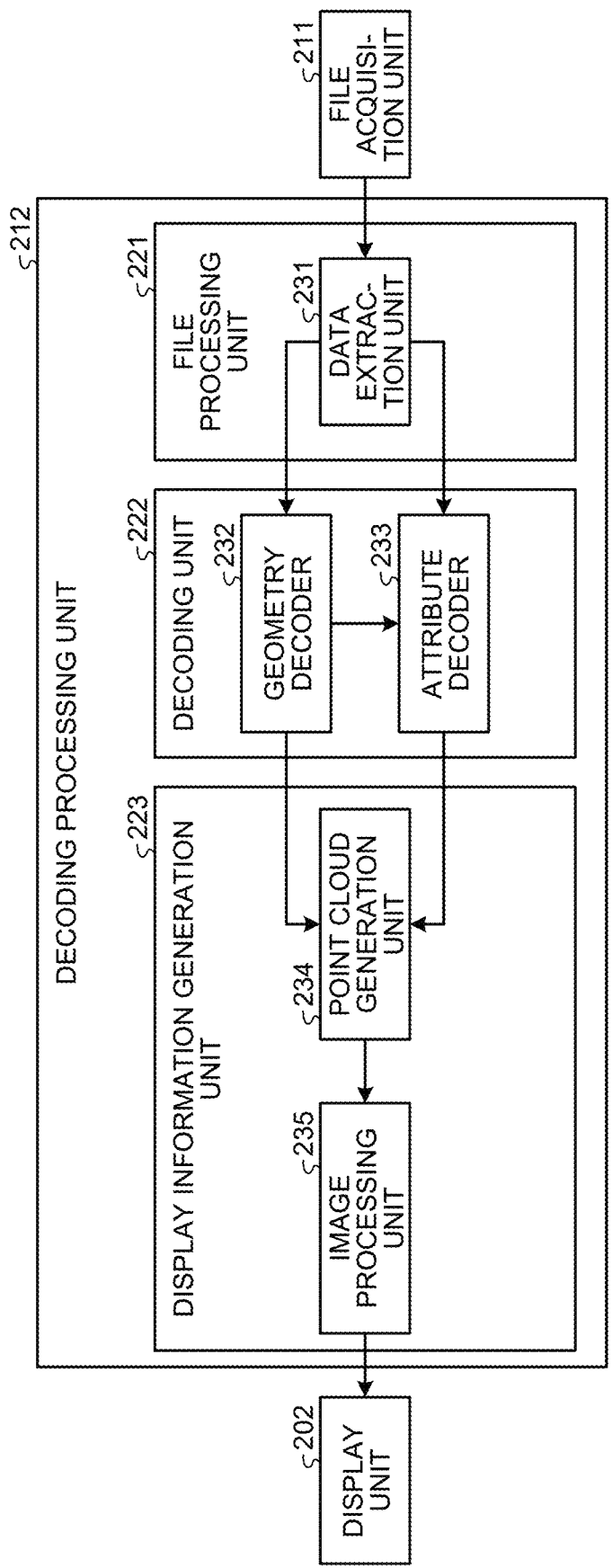
FIG. 13 is a block diagram illustrating details of a decoding processing unit.

The decoding processing unit 212 has a file processing unit 221, a decoding unit 222, and a display information generation unit 223. FIG. 13 is a block diagram illustrating a specific configuration of a decoding processing unit.

The file processing unit 221 has a data extraction unit 231. The data extraction unit 231 acquires the G-PCC file in which the G-PCC bitstream 1 output from the file acquisition unit 211 is stored. Subsequently, the data extraction unit 231 parses the acquired G-PCC file to extract metadata. Subsequently, the data extraction unit 231 acquires partial slice-specific information for each segmented slice from the SubSampleInformationBox included in the metadata. Then, the data extraction unit 231 acquires the information about the sub-sample corresponding to the segmented slice corresponding to the LoD for which reproduction is specified from the partial slice-specific information. The data extraction unit 231 extracts the segmented slices included in the LoD region specified from the sample of the G-PCC file as illustrated in the process P3 in FIG. 9. After that, the data extraction unit 231 acquires the size of the segmented slice included in the region equal to or larger than the specified LoD from the partial slice-specific information. Then, the data extraction unit 231 skips the segmented slice of the region equal to or larger than the specified LoD and moves to the header of the partial slice included in the region of the next specified LoD, as illustrated in the process P4 in FIG. 9. The file processing unit 221 repeats the processes P3 and P4 described above to extract a partial slice corresponding to the specified LoD from the geometry slice 13 and the attribute slice 14. Thus, the file processing unit 221 acquires a partial slice group corresponding to the specified LoD in the geometry bitstream and the attribute bitstream.

Then, the file processing unit 221 outputs a parameter related to decoding the partial slice group and the geometry included in the geometry bitstream corresponding to the specified LoD to a geometry decoder 232 of the decoding unit 222. In addition, the file processing unit 221 outputs a parameter related to decoding the partial slice group and the attribute included in the attribute bitstream corresponding to the specified LoD to an attribute decoder 233 of the decoding unit 222.

The decoding unit 222 has the geometry decoder 232 and the attribute decoder 233.

The geometry decoder 232 inputs the parameter related to decoding the partial slice group and the geometry included in the geometry bitstream corresponding to the specified LoD from the file processing unit 221. Then, the geometry decoder 232 decodes the acquired partial slice group by using the parameter related to decoding the geometry. Thus, the geometry decoder 232 acquires the data of the geometry corresponding to the specified LoD. In this event, the geometry decoder 232 outputs the position information on the decoded partial slice to the attribute decoder 233. After that, the geometry decoder 232 outputs the decoded partial slice group to a point cloud generation unit 234 of the display information generation unit 223.

In addition, the attribute decoder 233 inputs a parameter related to decoding the partial slice group and the attribute included in the attribute bitstream corresponding to the specified LoD from the file processing unit 221. Then, the attribute decoder 233 decodes the acquired partial slice group using the parameter related to decoding the attribute and the position information on the partial slice acquired from the geometry decoder 232. Thus, the attribute decoder 233 acquires the data of the attribute corresponding to the specified LoD. After that, the attribute decoder 233 outputs the decoded partial slice group to a point cloud generation unit 234 of the display information generation unit 223.

In this way, the geometry decoder 232 and the attribute decoder 233 acquire the partial slice group corresponding to the specified LoD from the file processing unit 221. Thus, it is possible to generate a point cloud corresponding to the specified LoD by performing normal decoding. In other words, the geometry decoder 232 and the attribute decoder 233 may not unnecessarily to perform processing such as extraction of partial slices corresponding to the specified LoD or skipping of unused partial slices.

The display information generation unit 223 has the point cloud generation unit 234 and an image processing unit 235.

The point cloud generation unit 234 inputs the partial slice group of the geometry bitstream subjected to the decoding processing from the geometry decoder 232. In addition, the point cloud generation unit 234 inputs the partial slice group of the attribute bitstream subjected to the decoding processing from the attribute decoder 233. Then, the point cloud generation unit 234 combines the geometry data corresponding to the specified LoD and the attribute data corresponding to the specified LoD to generate the point cloud corresponding to the specified LoD. After that, the point cloud generation unit 234 outputs the generated point cloud to the image processing unit 235.

The image processing unit 235 inputs the point cloud data corresponding to the specified LoD from the point cloud generation unit 234. Then, the image processing unit 235 performs rendering using the acquired point cloud data to generate an image to be displayed. After that, the image processing unit 235 outputs the display image to the display unit 202.

The display unit 202 has a display device such as a monitor. The display unit 202 inputs the display image generated by the image processing unit 235. Then, the display unit 202 causes the display device to display the acquired display image. This makes it possible for the display unit 202 to display the display image corresponding to the specified LoD on the display device.

[File Creation Procedure according to First Embodiment]

The procedure of file creation processing performed by the file creation device 100 according to the present embodiment is now described with reference to FIG. 14. FIG. 14 is a flowchart of file creation processing performed by the file creation device according to the first embodiment.

The extraction unit 101 inputs the original data of the point cloud content for displaying the three-dimensional image using the point cloud. Subsequently, the extraction unit 101 extracts geometry data and attribute data from the point cloud data included in the original data of the acquired point cloud content. The geometry encoder 122 performs encoding processing on the geometry data to generate the geometry slice 13 having LoD. The attribute encoder 123 performs encoding processing on the attribute data by using the control information and the position information input from the geometry encoder 122 to generate the attribute slice 14 having LoD. Thus, the geometry encoder 122 and the attribute encoder 123 encode the point cloud data (Step S101).

The bitstream generation unit 124 combines the encoded geometry slice 13 and attribute slice 14 to generate the G-PCC bitstream 1 (Step S102).

The metadata generation unit 125 acquires the G-PCC bitstream 1 from the bitstream generation unit 124. Subsequently, the metadata generation unit 125 determines to store the geometry slice 13 and the attribute slice 14 in one sample of a single track. Furthermore, the metadata generation unit 125 defines the segmented slice corresponding to each layer in the geometry slice 13 and the attribute slice 14 as a sub-sample. Subsequently, the metadata generation unit 125 sets a depth value representing the depth corresponding to each segmented slice in each segmented slice. Then, the file creation unit 126 stores the depth value of each segmented slice as partial slice-specific information in the SubSampleInfomarionBox (Step S103).

Further, the metadata generation unit 125 outputs, to the file creation unit 126, metadata such as access information on access to the partial slice of the geometry slice and the partial slice of the attribute slice corresponding to each LoD. The file creation unit 126 creates a G-PCC file in which the G-PCC bitstream 1, the SubSampleInfomarionBox including the partial slice-specific information, and the metadata are stored in the metadata region of the ISOBMFF file (Step S104). After that, the file creation unit 126 outputs the created G-PCC file to the transmission unit 106.

The transmission unit 106 inputs the G-PCC file of the point cloud content from the file creation unit 126. Then, the transmission unit 106 transmits the acquired G-PCC file to the web server 3 for uploading the point cloud content (Step S105).

[Reproduction Processing Procedure According to First Embodiment]

The procedure of reproduction processing executed by the client device 200 according to the present embodiment is now described with reference to FIG. 15. FIG. 15 is a flowchart of reproduction processing executed by the client device according to the first embodiment.

The file acquisition unit 211 transmits a request to acquire the point cloud content to the web server 300 and acquires the G-PCC file of the specified point cloud content from the web server 300. Subsequently, the data extraction unit 231 of the file processing unit 221 parses the ISOBMFF file, which is a G-PCC file, to extract metadata. Then, the data extraction unit 231 acquires the partial slice-specific information from the SubSampleInformationBox included in the metadata (Step S201).

Subsequently, the data extraction unit 231 extracts a partial slice group of each of the geometry bitstream and the attribute bitstream used for generating the point cloud of the specified LoD on the basis of the partial slice-specific information (Step S202). Then, the data extraction unit 231 outputs the partial slice group of the geometry bitstream to the geometry decoder 232 of the decoding unit 222. Further, the data extraction unit 231 outputs the partial slice group of the attribute bitstream to the attribute decoder 233 of the decoding unit 222.

The geometry decoder 232 and the attribute decoder 233 decode the extracted partial slice group of the geometry bitstream and the extracted partial slice group of the attribute bitstream, respectively (Step S203). Accordingly, the geometry decoder 232 and the attribute decoder 233 acquire the geometry data and the attribute data corresponding to the specified LoD, respectively.

The point cloud generation unit 234 of the display information generation unit 223 combines the decoded partial slice group of the geometry bitstream and the decoded partial slice group of the attribute bitstream to generate a point cloud (Step S204). After that, the point cloud generation unit 234 outputs the point cloud data to the image processing unit 235.

The image processing unit 235 acquires the point cloud data from the point cloud generation unit 234. Subsequently, the image processing unit 235 executes rendering on it to generate a display image. Then, the image processing unit 235 transmits the generated display image to the display unit 202 and causes the point cloud to be displayed as a three-dimensional image (Step S205).

In this regard, in the present embodiment, the metadata generation unit 125 sets the segmented slice of the geometry slice and the attribute slice as a sub-sample but also may set the geometry slice and the attribute slice as a sub-sample in other ways. In this case, it is possible to achieve a similar effect to the case where the metadata generation unit 125 defines the segmented slice as a sub-sample by, for example, expanding the byte length (32 bits) of codec_specific_parameters and storing the size of the segmented slice in each LoD for each sub-sample.

As described above, the file creation device according to the present embodiment sets the segmented slices for each layer corresponding to LoD of the geometry slice and the attribute slice as a sub-sample. Then, the file creation device acquires the size of the segmented slice as access information to the segmented slice. Furthermore, the file creation device sets a depth value that is information representing the depth corresponding to each segmented slice. Then, the file creation device creates SubSampleInformationBox including partial slice-specific information indicating the correspondence relation between the LoD and the partial slice formed by combining the segmented slices corresponding to the necessary depth. The client device acquires the partial slice-specific information included in the SubSampleInformationBox from the ISOBMFF file of the G-PCC bitstream and acquires the partial slice group corresponding to the specified LoD from the geometry slice and the attribute slice. Then, the decoder of the client device is capable of acquiring the geometry data and the attribute data corresponding to the specified LoD by decoding the partial slice group corresponding to the LoD.

In this way, the client device is capable of identifying and extracting the position of the partial slice used to obtain the data corresponding to the desired LoD on the basis of the partial slice-specific information included in the ISOBMFF file of the G-PCC bitstream to input the position information in the decoder. This makes it possible to perform the LoD scalable decoding without implementing an additional function for the LoD scalable decoding in the decoder. Thus, it is possible to perform the LoD scalable decoding that is independent of the decoder, providing the viewing experience that meets the viewer's request regardless of the type of client device.

1.1 Modification (1) of First Embodiment

Modification (1) of the first embodiment is now described. The file creation device 100 according to the present modification provides the client device 200 with an index for making the LoD selectable depending on the processing performance of the client device 200.

The metadata generation unit 125 of the file creation device 100 according to the present modification stores the number of decoding points, which is the number of points to be decoded for each LoD, in codec_specific_parameters in SubSumpleInformationBox. For example, the metadata generation unit 125 creates codec_specific_parameters illustrated in syntax 35 illustrated in FIG. 16. FIG. 16 is a diagram illustrating an example of codec_specific_parameters according to Modification (1) of the first embodiment. In the syntax 35, total point represents the number of decoding points.

In this regard, in the present modification, the metadata generation unit 125 uses the number of decoding points as an index, but the index is not limited to the number of decoding points. Other information can be used as long as it is information representing the load in the decoding processing for each LoD. In addition, in the present modification, the metadata generation unit 125 stores the index in the codec_specific_parameters, but also can store the index in the high-level syntax (HLS) of the G-PCC bitstream 1 instead of the ISOBMFF file. As the HLS, for example, SPS, APS, GPS, tile inventory, geometry slice 13, or attribute slice 14 can be used.

The file processing unit 221 of the client device 200 parses the ISOBMFF file of the point cloud content to acquire the metadata. Then, the file processing unit 221 checks the codec_specific_parameters in the SubSumpleInformationBox included in the metadata and acquires the number of decoding points for each LoD. Subsequently, the file processing unit 221 selects an appropriate LoD depending on the processing performance of its own device by using the number of decoding points for each LoD. After that, the file processing unit 221 extracts the partial slice corresponding to the selected LoD from the geometry and attribute slices and outputs the extracted partial slice to the decoding unit 222.

As described above, the file creation device according to the present embodiment transmits an index indicating the load of the decoding processing for each LoD to the client device. The client device selects the LoD to be decoded on the basis of the provided index. This makes it possible for the client device to determine the LoD to be decoded using a more detailed criterion upon decoding with the low LoD. Thus, the client device is capable of providing the user with a three-dimensional image with more appropriate LoD, providing the viewing experience that meets the viewer's request.

1.2 Modification (2-1) of First Embodiment

Modification (2-1) of the first embodiment is now described. The file creation device 100 according to the present modification differs from that of the first embodiment in that the partial slice-specific information used for obtaining the desired LoD is stored in the timed metadata.

Figure 17:
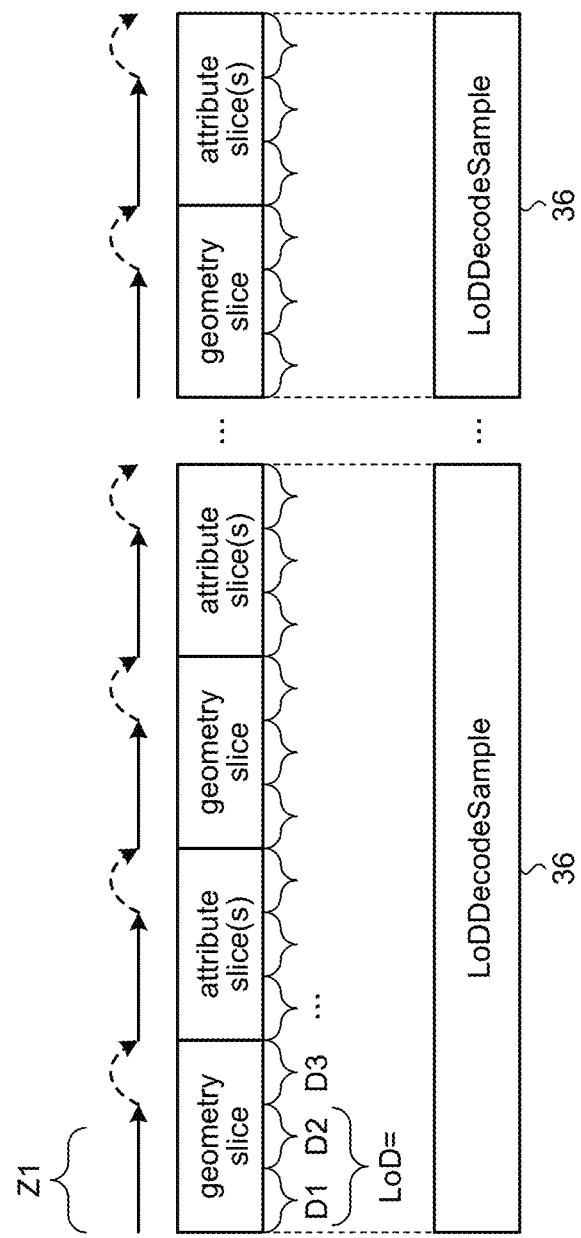
FIG. 17 is a diagram for describing access information and hierarchical information according to Modification (2-1) of the first embodiment.

FIG. 17 is a diagram illustrated to describe access information and hierarchical information according to Modification (2-1) of the first embodiment. The metadata generation unit 125 of the file creation device 100 according to the present embodiment determines to store the partial slice-specific information in timed metadata 36. In this event, the metadata generation unit 125 sets the sample entry type of the timed metadata 36 as LoDDecodeSample. Furthermore, the metadata generation unit 125 links a timed metadata track with a track that stores the G-PCC bitstream 1 using a track reference. In addition, the metadata generation unit 125 stores the decoding position information for each LoD for the sample of the G-PCC bitstream 1 aligned with a decoding time stamp (DTS) in the timed metadata. In other words, the sample storing the geometry slice and the attribute slice of the G-PCC bitstream 1 and the timed metadata are time-synchronized, as illustrated in FIG. 17.

Figures 18, 19:
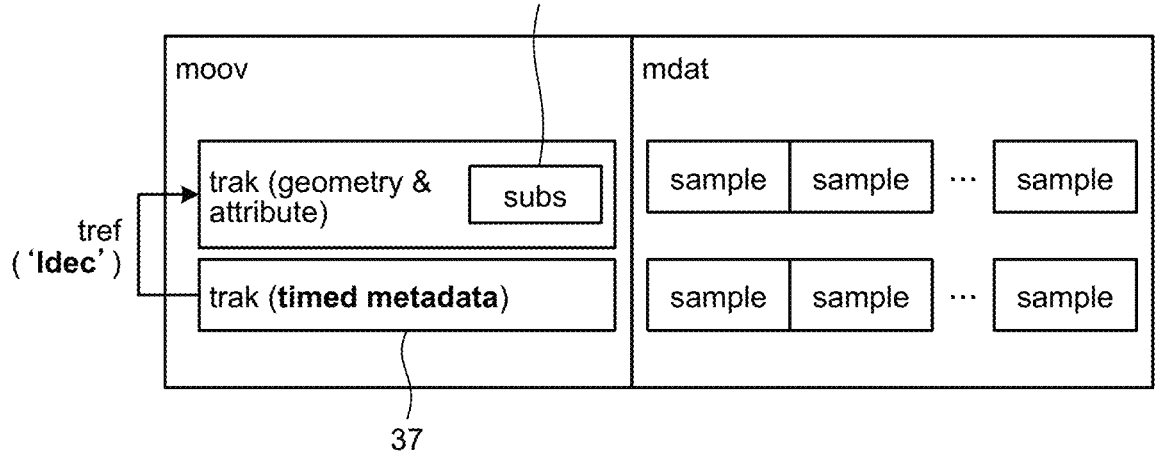
FIG. 18 is a diagram illustrating an example of timed metadata according to Modification (2-1) of the first embodiment.
FIG. 19 is a diagram illustrating a storage example of the timed metadata according to Modification (2-1) of the first embodiment.

FIG. 18 is a diagram illustrating exemplary timed metadata according to Modification (2-1) of the first embodiment. For example, the metadata generation unit 125 generates the timed metadata 36 having the syntax illustrated in FIG. 18. In the syntax in FIG. 18, unit_index represents an index that is used as identification information for the geometry slice and the attribute slice in the G-PCC bitstream 1. In addition, data_length_byte represents the numerical value of the part in byte units in the size of the partial slice corresponding to each LoD. In addition, data_length_bits represents the numerical value of the part in byte units in the size of the partial slice corresponding to each LoD. In other words, the value obtained by adding data_length_byte and data_length_bits corresponds to the size of the partial slice corresponding to each LoD. Here, the size of the partial slice corresponding to each LoD corresponds to the size of all the data for obtaining the image corresponding to the LoD, that is, the sum of all the data of the segmented slices corresponding to each layer included in the LoD. For example, as illustrated in FIG. 17, in the case where layers D1 to D2 corresponding to segmented slices exist in one geometry slice and partial slices corresponding to LoD=1 include data up to layer D2, the value obtained by adding the data_length_byte and data_length_bits is the value representing a size Z1. In this case, the access information corresponds to the unit_index of each of the geometry and attribute slices and to the data length from the header of each of the geometry slice 13 and the attribute slice 14 corresponding to the value obtained by adding the data_length_byte and data_length_bits.

FIG. 19 is a diagram illustrating a storage example of timed metadata according to Modification (2-1) of the first embodiment. The file creation unit 126 inputs the metadata including the timed metadata 36 together with the G-PCC bitstream 1 from the metadata generation unit 125.

Then, the file creation unit 126 stores the G-PCC bitstream 1 in the sample. In addition, the file creation unit 126 stores the timed metadata 36 in the timed metadata track illustrated in a box 37. Furthermore, the file creation unit 126 stores the SubSampleInformationBox specified in Non Patent Literature 4 in the location indicated by a box 38. In this case, the sub-sample is set as one parameter set, geometry slice, or attribute slice. In addition, the codec-specific parameters are defined as syntax 39 illustrated in FIG. 20.

FIG. 20 is a diagram illustrating an example of codec specific parameters according to Modification (2-1) of the first embodiment. The information illustrated in the syntax 39 illustrated in FIG. 20 makes it possible to identify the boundary of the slice 12 and the type of the slice 12, that is, whether it is a parameter set, a geometry slice, or an attribute slice. In addition, the timed metadata 36 stored in the box 37 and the sub-sample information stored in the box 38 are linked using a track reference.

The file processing unit 221 of the client device 200 parses the ISOBMFF file of the point cloud content to acquire the timed metadata 36. Then, the file processing unit 221 acquires the decoding position of the partial slice corresponding to the specified LoD from the timed metadata 36. Then, the file processing unit 221 extracts the partial slice corresponding to the specified LoD by acquiring the data of the decoding time corresponding to the acquired decoding position from the geometry slice and the attribute slice. After that, the file processing unit 221 outputs the extracted partial slice group to the decoding unit 222.

As described above, the file creation device according to the present modification stores the partial slice-specific information in the timed metadata. Then, the client device specifies the decoding position of the partial slice corresponding to the specified LoD from the timed metadata and extracts the partial slice from the geometry slice and the attribute slice. In the first embodiment, upon decoding a point cloud of the desired LoD, the client device reads all SubSampleInformation before decoding and calculates the position of the partial slice to be decoded. On the other hand, the client device according to the present modification is capable of setting the decoding position of the partial slice corresponding to the desired LoD for each sample from the timed metadata sample at the same time on the basis of the decoding time of the sample of the G-PCC bitstream, simplifying the processing of extracting partial slices. In addition, the client device is also capable of acquiring data only for the partial slice used to display the image corresponding to the specified LoD at the time of delivery from the web server by referring to the timed metadata.

1.3 Modification (2-2) of First Embodiment

Modification (2-2) of the first embodiment is now described. The file creation device according to the present embodiment stores the index used for selecting the LoD according to the processing performance of the client in the timed metadata, which is similar to Modification (1) of the first embodiment.

FIG. 21 is a diagram illustrating exemplary timed metadata according to Modification (2-2) of the first embodiment. The metadata generation unit 125 according to the present modification generates the timed metadata 36 in which information on total points representing the number of decoding points for each LoD illustrated in line 40 is stored.

In this regard, in the present modification, the metadata generation unit 125 uses the number of decoding points as an index, but the index is not limited to the number of decoding points. Other information can be used as long as it is information representing the load in the decoding processing for each LoD. In this regard, in the present modification, the metadata generation unit 125 generates information to be stored in the ISOBMFF file as an index, but the index is not limited to the information to be stored in the ISOBMFF file, but also can generate the index to be stored in the HLS of the G-PCC bitstream 1. As the HLS, for example, SPS, APS, GPS, tile inventory, geometry slice 13, or attribute slice 14 can be used.

The file processing unit 221 of the client device 200 parses the ISOBMFF file of the point cloud content to acquire the metadata. Then, the file processing unit 221 acquires the number of decoding points for each LoD corresponding to each sub-sample included in the timed metadata 36. Subsequently, the file processing unit 221 selects an appropriate LoD depending on the processing performance of its own device by using the number of decoding points for each LoD. After that, the file processing unit 221 extracts the partial slice corresponding to the selected LoD from the geometry and attribute slices and outputs the extracted partial slice to the decoding unit 222.

As described above, the file creation device according to the present embodiment transmits an index indicating the load of the decoding processing for each LoD to the client device using the timed metadata. The client device selects the LoD to be decoded on the basis of the index provided by using the timed metadata. This makes it possible for the client device to determine the LoD to be decoded using a more detailed criterion upon decoding with the low LoD. Thus, in the case of notifying the LoD for each partial slice using the timed metadata, the client device is also capable of providing the user with a three-dimensional image with more appropriate LoD, providing the viewing experience that meets the viewer's request.

1.4 Modification (2-3) of First Embodiment

Modification (2-3) of the first embodiment is now described. The metadata generation unit 125 can further extend the partial slice-specific information to store the unit type of the partial slice indicating whether each partial slice is the geometry slice 13 or the attribute slice 14. In addition, for the attribute slice 14, the metadata generation unit 125 can store the attribute type (attribute_type) in the partial slice-specific information. The metadata generation unit 125 can allow the side of the client device 2 to determine whether or not to decode each attribute slice 14 depending on the attribute.

Further, the metadata generation unit 125 can store the information associated with the entry of the SubSampleInformationBox specified in Non Patent Literature 4 instead of unit_index, data_length_byte, and data_length_bits stored in the timed metadata 36. Furthermore, the metadata generation unit 125 can store the byte position in the timed metadata 36 instead of unit_index.

Further, the metadata generation unit 1125 can store the partial slice-specific information in LodDecodeBox in which all types of the decode entry are newly defined and store the LodDecodeBox in SammpleEntry.

1.5 Modification (3-1) of First Embodiment

Modification (3-1) of the first embodiment is now described. The file creation device 100 according to the present modification differs from that of the first embodiment in that the G-PCC bitstream 1 having a layered structure slice is used.

Figure 22:
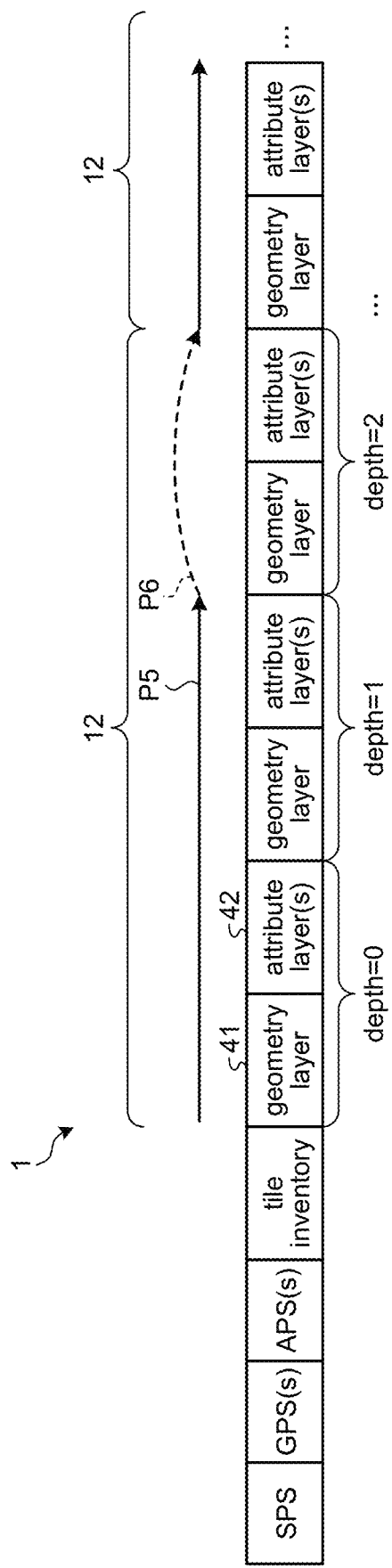
FIG. 22 is a diagram illustrating a G-PCC bitstream having a layered structure slice.

FIG. 22 is a diagram illustrating a G-PCC bitstream having a layered structure slice. The layered structure slice is a structure in which the slices 12 are divided into layers for each LoD layer, as illustrated in FIG. 22. In other words, the segmented slices of the geometry and attribute slices in the first embodiment are defined in advance in units called layers, and the geometry slice and the attribute slice have a hierarchical format structure by layers. Each slice 12 includes a geometry layer 41 and an attribute layer 42 for each layer corresponding to each depth.

Even in the first embodiment, the geometry slice and the attribute slice have a hierarchical structure forming a partial slice, but each segmented slice is not defined as a predetermined unit. On the other hand, the geometry slice and the attribute slice according to the present modification have a layer that is a predetermined unit therein. The combination of the geometry layer 41 and the attribute layer 42 up to a particular layer allows one geometry slice bitstream or one attribute bitstream corresponding to each LoD to be formed.

In the case where the G-PCC bitstream 1 has a layered structure slice, decoding up to the desired LoD can be achieved by decoding in layer units. Thus, skipping is not performed inside each of the geometry slice and the attribute slice. However, even in the layered structure slice, the data skip processing is still performed due to the existence of the plurality of slices 12 in the sample. The data skip in this case is performed on a layer-by-layer basis.

The metadata generation unit 125 sets each of the geometry and attribute layers as a sub-sample. In addition, the metadata generation unit 125 sets a depth value that is information representing the depth corresponding to each layer. Then, the metadata generation unit 125 generates partial slice-specific information indicating the correspondence relation between the partial slice and the LoD from the depth information corresponding to the layer.

The data extraction unit 231 of the client device 2 parses the ISOBMFF file of the point cloud content to acquire the metadata. Then, the data extraction unit 231 specifies the geometry and attribute layers corresponding to the specified LoD from the partial slice-specific information stored in the SubSampleInformationBox included in the metadata. Then, a data extraction unit 213 extracts the specified geometry layer and attribute layer as illustrated in a process P5 and uses the boundary of each layer acquired from the SubSampleInformationBox to skip to the next interleaved layer as illustrated in a process P6. The data extraction unit 231 repeats the processes P5 and P6 to extract a partial slice group for generating a three-dimensional image of the point cloud corresponding to the specified LoD.

As described above, the file creation device according to the present modification creates SubSampleInformationBox including partial slice-specific information for extracting the desired LoD using a G-PCC bitstream having a layered structure slice. The client device uses the partial slice-specific information included in the SubSampleInformation-Box to extract the partial slice corresponding to the desired LoD from the G-PCC bitstream having the layered structure slice and causes the decoder to decode it. This makes it possible to implement LoD scalable decoding that is independent of the decoder even upon using the hierarchical structure, providing the viewing experience that meets the viewer's request.

1.6 Modification (3-2) of First Embodiment

Modification (3-2) of the first embodiment is now described. The file creation device 100 according to the present modification performs processing similar to that of Modification (2-1) of the first embodiment using the G-PCC bitstream 1 having a layered structure slice.

The metadata generation unit 125 determines to store each partial slice-specific information for specifying the geometry and attribute layers in the timed metadata 36. In this event, the metadata generation unit 125 is the sample entry type of the timed metadata 36 as LoDDecodeSample. Furthermore, the metadata generation unit 125 links a timed metadata track with a track that stores the G-PCC bitstream 1 using a track reference. In addition, the metadata generation unit 125 stores the decoding position information for each LoD for the sample of the G-PCC bitstream 1 aligned with a decoding time stamp (DTS) in the timed metadata. In other words, the sample storing the geometry and attribute layers of the G-PCC bitstream 1 and the timed metadata are time-synchronized.

FIG. 23 is a diagram illustrating exemplary timed metadata according to Modification (3-2) of the first embodiment. For example, the metadata generation unit 125 generates timed metadata 43 having the syntax illustrated in FIG. 23. The metadata generation unit 125 generates the timed metadata 43 obtained by replacing the definition of unit_index with layer_index, which is the identification information on each of the geometry layer 41 and the attribute layer 42, instead of data_length_byte and data_length_bits in the timed metadata 36 in FIG. 18. The definition of the geometry layer 41 or the attribute layer 42 as a sub-sample makes it possible to identify the boundary of each layer by the default SubSampleInformationBox in Non Patent Literature 4. Moreover, the layer_index of the heading layer and the number of subsequent layers that is necessary to be decoded can be stored using a method such as run-length encoding. It has the effect of reducing the number of bits in the case where the layer_index is continuous.

Figure 24:
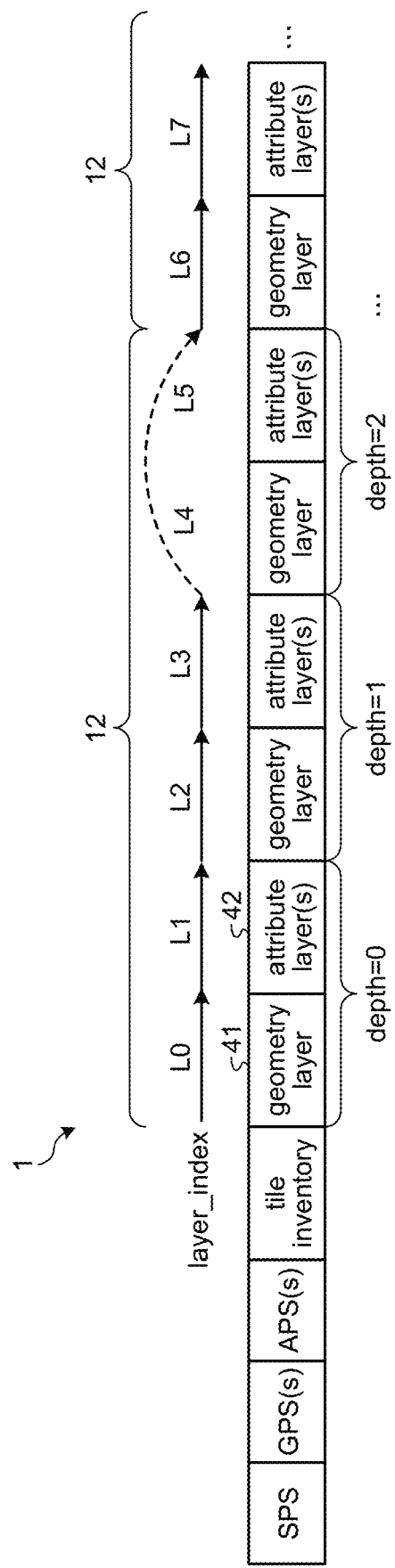
FIG. 24 is a diagram illustrating the extraction of a partial slice according to Modification (3-2) of the first embodiment.

The file processing unit 221 of the client device 200 parses the ISOBMFF file of the point cloud content to acquire the timed metadata 43. Then, the file processing unit 221 acquires the decoding position of the geometry layer and the attribute layer corresponding to the LoD specified by using the layer_index included in the timed metadata 43 from the timed metadata 36. Then, the file processing unit 221 extracts the data of the decoding time corresponding to the acquired decoding position from the geometry slice and the attribute slice as illustrated in FIG. 24. FIG. 24 is a diagram illustrating the extraction of a partial slice according to Modification (3-2) of the first embodiment.

For example, in FIG. 24, layer_index of each layer has L0 to L7, and the layers with depth=0 have Layer_index=L0 and L1. In addition, the layers with depth=1 have Layer_index=L2 and L3, and the layers with epth=2 have Layer_index=L4 and L5. In the case where LoD=1 including the hierarchy of depth=0 and 1 is specified, the file processing unit 221 specifies the decoding position of the layer having Layer_index=L0 to L3 from the timed metadata 43. Then, the file processing unit 221 extracts the data of the decoding time corresponding to the decoding position of the layer having Layer_index=L0 to L3 from the geometry slice and the attribute slice. Subsequently, the file processing unit 221 skips the layers having Layer_index=L4 and L5 and extracts the data from the decoding position of the next layer having Layer_index=L6.

As described above, the file creation device according to the present modification stores the partial slice-specific information in the timed metadata in using the G-PCC bitstream having the layered structure slice. Then, the client device specifies the decoding position of the layers corresponding to the specified LoD from the timed metadata and extracts the partial slice from the geometry slice and the attribute slice. Thus, the client device according to the present modification is capable of setting the decoding position of the partial slice corresponding to the desired LoD for each sample from the timed metadata sample at the same time on the basis of the decoding time of the sample of the G-PCC bitstream, simplifying the processing of extracting partial slices. Furthermore, it is possible to further reduce the number of data bits by using layer_index instead of data_length_byte and data_length_bits.

1.7 Modification (3-3) of First Embodiment

Modification (3-3) of the first embodiment is now described. The file creation device 100 according to the present modification handles the G-PCC bitstream 1 in which the slices 12 of hierarchical structure and normal structure are mixed. FIG. 25 is a diagram illustrating exemplary timed metadata according to Modification (3-3) of the first embodiment.

The metadata generation unit 125 according to the present modification generates timed metadata 44 illustrated in FIG. 25. The timed metadata 44 specifies the slice structure using layer_flag of line 45. For example, if the value of layer_flag is 0, it is the normal structure slice, and if the value is 1, it is the layered structure slice. Then, data_length_bytes and data_length_bits are used for the normal structure slice, and units_index is used for the layered structure slice. In this way, the metadata generation unit 125 defines the partial slice-specific information corresponding to the G-PCC bitstream 1 in which the layered structure slice and the normal structure slice are mixed.

The file processing unit 221 of the client device 200 acquires the timed metadata 44 to extract the partial slice depending on the slice structure.

As described above, even in the case where the layered structure slice and the normal structure slice are mixed, it is possible to implement the LoD scalable decoding independent of the decoder.

2. Second Embodiment

A second embodiment is now described. The file creation device according to the present embodiment differs from that of the first embodiment in that it enables processing for each tile using a sample group and performs LoD scalable decoding for each tile. The file creation device according to the present embodiment is also represented by the block diagram in FIG. 8. In addition, the client device according to the present embodiment is also represented by the block diagrams in FIGS. 12 and 13. The description of the functions of the respective components similar to those of the first embodiment is omitted below.

Figure 26:
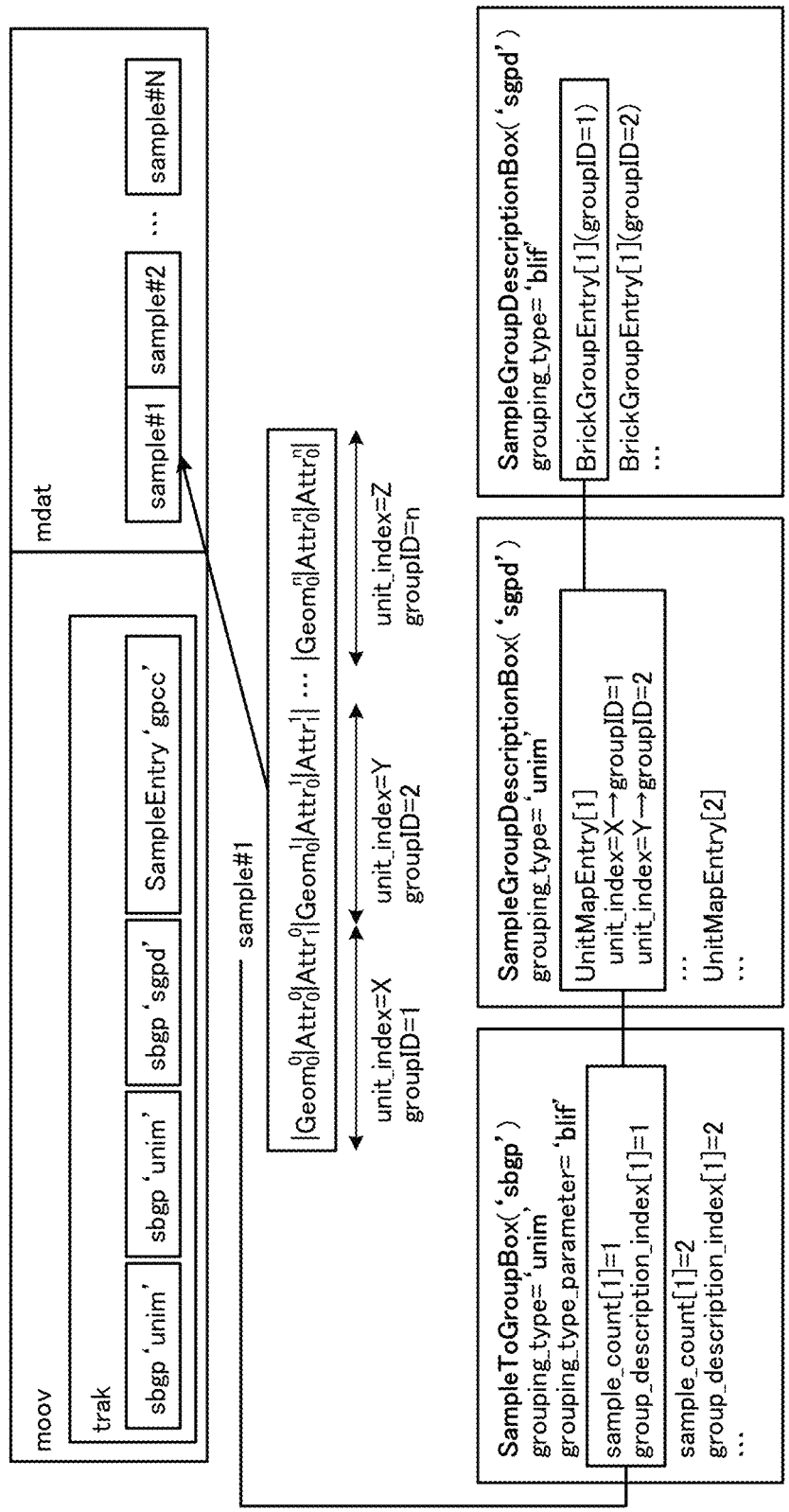
FIG. 26 is a diagram illustrating an exemplary configuration of a sample group.

The metadata generation unit 125 of the file creation device 100 according to the present embodiment generates a sample group by collecting the geometry slice and the attribute slice for each tile 11 using the configuration illustrated in FIG. 26. FIG. 26 is a diagram illustrating an exemplary configuration of the sample group. The sample group is a grouping structure in ISOBMFF that enables a plurality of decoding targets to be grouped together to handle them as one target.

For example, the metadata generation unit 125 divides the geometry slice and the attribute slice into the respective segmented slices for each depth and sets each segmented slice as a sub-sample, similar to the first embodiment. In addition, the metadata generation unit 125 sets a depth value that is information representing the depth corresponding to each segmented slice. Then, the metadata generation unit 125 stores the partial slice access information indicating the correspondence relation between the partial slice and LoD in the SubSmapleInformationBox.

Furthermore, the metadata generation unit 125 extends the sample group ('unim') and uses UnitMapEntry having syntax 50 illustrated in FIG. 27 to associate the sub-sample entry of the partial slice with the sample group to which the partial slice belongs. FIG. 27 is a diagram illustrating an example of UnitMapEntry according to a second embodiment. Thus, the metadata generation unit 125 generates a sample group in which the geometry slice and the attribute slice are grouped for each tile 11. In the syntax 50, lines 51 indicates the access information in SubSampleInformationBox of the sub-sample included in the sample group.

Figure 28:
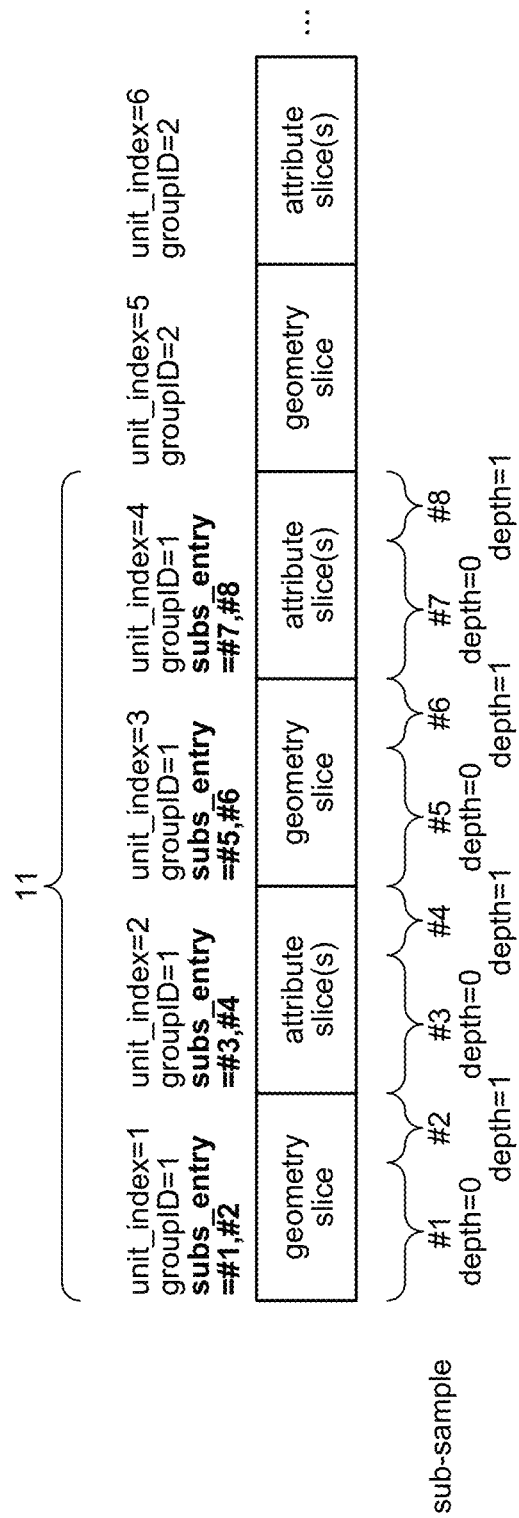
FIG. 28 is a diagram illustrating an example of a sample group according to the second embodiment.

FIG. 28 is a diagram illustrating an example of a sample group according to the second embodiment. For example, as illustrated in FIG. 28, the respective geometry and attribute slices of unit_index=1 and 2 are included in one tile 11. The metadata generation unit 125 sets this tile 11 as a sample group having a group ID=1, which is identification information. Then, the metadata generation unit 125 sets subsamples corresponding to the segmented slices of the geometry slice and the attribute slice corresponding to the tile 11 to #1 to #8 in SubSampleInformationBox. Furthermore, the metadata generation unit 125 indicates which sub-sample is used in the sample group in which each group ID is 1 by subs entry of UnitMapEntry.

The client device 200 is capable of changing the LoD used for each sample group. For example, the client device 200 receives an instruction to decode a sample group at high LoD and another sample group at low LoD.

The data extraction unit 231 extracts the segmented slice corresponding to the specified high LoD from the geometry slice and the attribute slice included in the sample group specified for decoding at high LoD. In addition, the data extraction unit 231 extracts the segmented slice corresponding to the specified low LoD from the geometry slice and the attribute slice included in the sample group specified for decoding at low LoD. Then, the data extraction unit 231 outputs the extracted partial slice group corresponding to the high LoD and the extracted partial slice group corresponding to the low LoD for each sample group to the decoding unit 222 for decoding.

Figure 29:
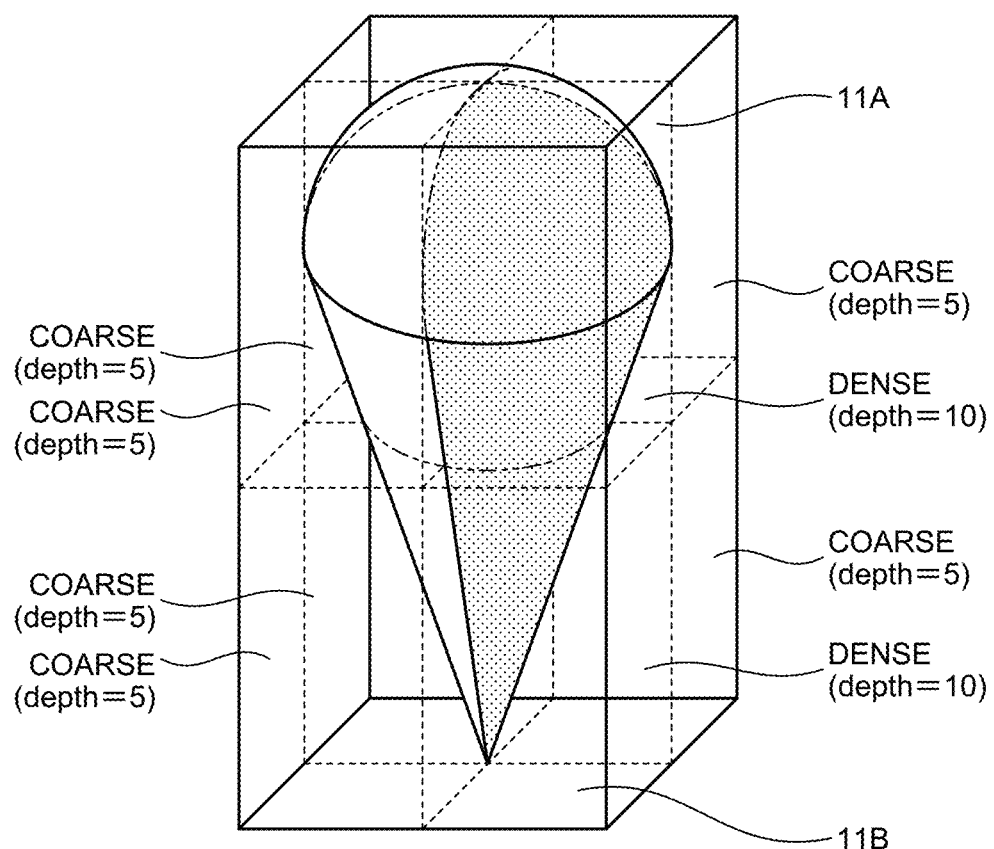
FIG. 29 is a diagram illustrating an example of a three-dimensional image of a point cloud in which LoD is made different for each tile.

Thus, the file creation device 100 is capable of generating a three-dimensional image of a point cloud in which LoD is different for each tile 11 as illustrated in FIG. 29. FIG. 29 is a diagram illustrating an example of a three-dimensional image of a point cloud in which LoD is different for each tile 11. In FIG. 29, in tiles 11A and 11B, data decoded at high LoD including up to depth=10 is displayed as a dense and detailed image. In addition, in the tile 11 of the portion other than the tiles 11A and 11B, the data decoded at the low LoD including up to depth=5 is displayed as a sparse and coarse image.

In this regard, in the present embodiment, UnitMapEntry is used as the metadata for tile access, and SubSampleInformationBox is used as the metadata for LoD access. However, both information can be stored together in SubSampleInformationBox.

As described above, the file creation device according to the present embodiment collects the geometry slice and attribute slice included in the tile as a sample group for each tile. The client device inputs the LoD specified for each sample group and displays a three-dimensional image of the point cloud decoded with different types of LoD for each tile. Thus, for example, it is possible to display a three-dimensional image in which a tile near the viewpoint position is decoded at high LoD and a tile far from the viewpoint is decoded at low LoD, providing the viewing experience that meets requests of a content creator or a viewer.

2.1 Modification (1) of Second Embodiment

Modification (1) of the second embodiment is now described. The file creation device 100 according to the present modification differs from that of the second embodiment in that the partial slice-specific information is stored in the timed metadata. FIG. 30 is a diagram illustrating exemplary timed metadata according to Modification (1) of the second embodiment.

The metadata generation unit 125 according to the present modification generates timed metadata 52 illustrated in FIG. 30, which includes information about the tile 11 and the partial slice information. In the timed metadata 52, line 53 represents the information about the tile 11. In addition, in the timed metadata 52, line 54 represents the partial slice information as in Modification (2-1) of the first embodiment. In other words, the partial slice corresponding to each tile 11 illustrated in the line 53 is represented by the line 54.

The data extraction unit 231 of the client device 200 specifies the decoding position of the partial slice corresponding to the high LoD specified by using the timed metadata for the geometry slice and the attribute slice included in the sample group specified to be decoded at the high LoD. In addition, the data extraction unit 231 specifies the decoding position of the partial slice corresponding to the low LoD specified by using the timed metadata for the geometry slice and the attribute slice included in the sample group specified to be decoded at the low LoD. Then, the data extraction unit 231 extracts the partial slice group corresponding to the specified decoding position. After that, the data extraction unit 231 outputs the extracted partial slice group corresponding to the high LoD and the extracted partial slice group corresponding to the low LoD for each sample group to the decoding unit 222 for decoding.

Moreover, in the present modification, the LoD is changed for each tile, but the metadata generation unit 125 can store the decoding position for each LoD with respect to the spatial information for each slice.

As described above, the file creation device according to the present modification stores the partial slice-specific information on the geometry slice and the attribute slice grouped as a sample group for each tile in the timed metadata. Then, the client device specifies the decoding position of the partial slice corresponding to the specified LoD from the timed metadata according to the LoD for each specified subsample and extracts the partial slice from the geometry slice and the attribute slice. The client device according to the present modification is capable of setting the decoding position of the partial slice corresponding to the desired LoD for each sample from the timed metadata sample at the same time on the basis of the decoding time of the sample of the G-PCC bitstream. Thus, the client device according to the present modification is capable of displaying the LoD changed for each tile while simplifying the processing of extracting the partial slice.

2.2 Modification (2-1) of Second Embodiment

Figure 31:
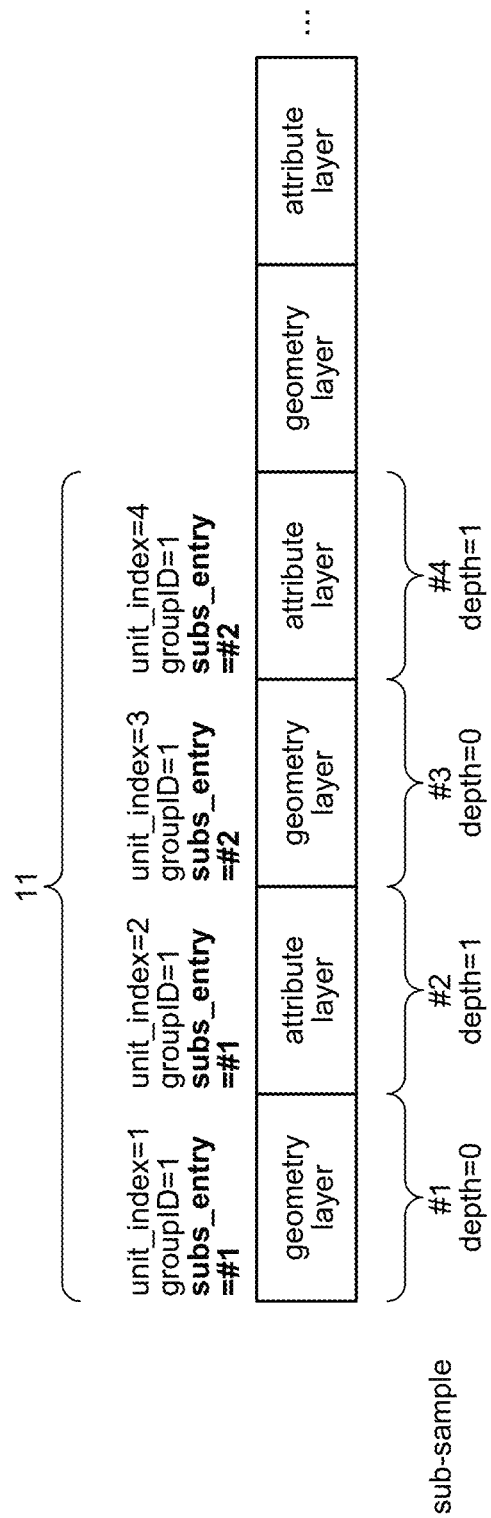
FIG. 31 is a diagram illustrating a correspondence relation between a sample group and a sub-sample according to Modification (2-1) of the second embodiment.

Modification (2-1) of the second embodiment is now described. The file creation device 100 according to the present modification uses the G-PCC bitstream 1 having the layered structure slice. FIG. 31 is a diagram illustrating a correspondence relation between a sample group and a sub-sample according to Modification (2-1) of the second embodiment.

The metadata generation unit 125 according to the present modification defines each of the geometry and attribute layers as a sub-sample. In addition, the metadata generation unit 125 sets a depth value that is information representing the depth corresponding to each layer. Then, the metadata generation unit 125 creates SubSampleInformationBox including partial slice-specific information representing the correspondence relation between each of the layers and the LoD. Furthermore, the metadata generation unit 125 uses the UnitMapEntry represented by the syntax 50 in FIG. 27 to associate each tile 11 with the SubSmapleInfomarionBox having partial slice-specific information. Thus, as illustrated in FIG. 31, each sample group is associated with the sub-sample corresponding to the geometry layer 41 and the attribute layer 42.

The data extraction unit 231 of the client device 2 parses the ISOBMFF file of the point cloud content to acquire the metadata. Then, the data extraction unit 231 specifies the geometry and attribute layers corresponding to the LoD different types of LoD for each tile 11 from the partial slice-specific information stored in the SubSampleInformationBox included in the metadata. Then, the data extraction unit 213 extracts the specified geometry and attribute layers.

Further, although the case where the depth value is stored in the SubSampleInformationBox is described above, the metadata generation unit 125 may store a depth value in the sample group without using SubSampleInformationBox, as illustrated in syntax 55 in FIG. 32. FIG. 32 is a diagram illustrating UnitMapEntry upon storing a depth value in a sample group according to Modification (2-1) of the second embodiment. In addition, FIG. 33 is a diagram illustrating a state of a sample group storing a depth value according to Modification (2-1) of the second embodiment. In this case, as illustrated in FIG. 33, the depth value of each layer is indicated by the subsample group having the group ID=1, which is the identification information corresponding to the particular tile 11.

As described above, the file creation device according to the present modification creates SubSampleInformationBox including partial slice-specific information for extracting the LoD different for each layer using a G-PCC bitstream having a layered structure slice. The client device uses the partial slice-specific information included in the SubSampleInformationBox to extract the partial slice corresponding to the LoD different for each layer from the G-PCC bitstream having the layered structure slice and causes the decoder to decode it. This makes it possible to display a three-dimensional image of a point cloud in which LoD different for each layer is used even upon using the hierarchical structure, providing the viewing experience that meets the viewer's request.

2.3 Modification (2-2) of Second Embodiment

Modification (2-2) of the second embodiment is now described. The file creation device 100 according to the present modification uses the G-PCC bitstream 1 having the layered structure slice and stores the partial slice-specific information in the timed metadata.

The metadata generation unit 125 according to the present modification generates timed metadata including the information on the tile 11 and the information on the geometry layer and the attribute layer. In the timed metadata in this case, the part of line 54 in the timed metadata 52 in FIG. 30 used in Modification (1) of the second embodiment replaces the definition of unit_index with layer_index, which is the identification information on the geometry layer and attribute layer, instead of data_length_byte and data_length_bits.

The data extraction unit 231 of the client device 2 parses the ISOBMFF file of the point cloud content to acquire the metadata. Then, the data extraction unit 231 specifies the geometry and attribute layers corresponding to the LoD different types of LoD for each tile 11 from the partial slice-specific information stored in the timed metadata. Then, the data extraction unit 213 extracts the specified geometry and attribute layers.

Further, although the present modification uses the timed metadata equivalent to the timed metadata 52 in FIG. 30, in addition to this, the metadata generation unit 125 is also capable of employing the timed metadata using the sample group. FIG. 34 is a diagram illustrating timed metadata upon using a sample group according to Modification (2-2) of the second embodiment.

For example, the metadata generation unit 125 generates two types of timed metadata 56 and 57 illustrated in the syntax in FIG. 23. The metadata generation unit 125 sets a sample group of tiles 11 for each LoD on the basis of these types of timed metadata 56 and 57. For example, the metadata generation unit 125 extends BrickGroupEntry and sets the definition as follows. The metadata generation unit 125 assumes that if the value of lod stored in the timed metadata 56 is 0, the corresponding layer is a layer with LoD=0, and if the value of lod is 1, the layer is a layer included in both LoD=0 and LoD=1.

Figure 35:
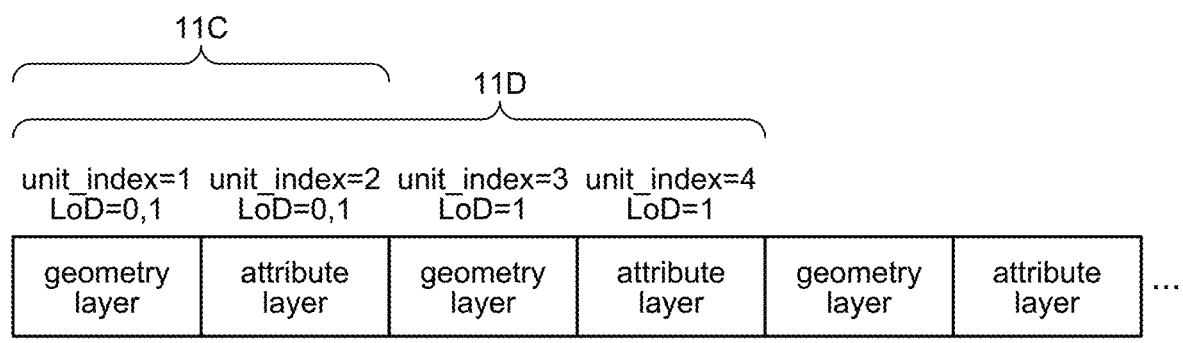
FIG. 35 is a diagram illustrating the correspondence between each layer and LoD according to Modification (2-2) of the second embodiment.

FIG. 35 is a diagram illustrating the correspondence of each of the layers to the LoD according to Modification (2-2) of the second embodiment. The timed metadata 56 and 57 indicate, for example, that the geometry and attribute layers with unit_indexf=1 and 2 are layers with LoD=0 and 1 and they are included in a tile 11C, as illustrated in FIG. 35. It is also illustrated that the geometry layer and attribute layer with unit_index=3 and 4 are layers with LoD=1 and are included in a tile 11D.

As described above, the file creation device according to the present modification creates the timed metadata including partial slice-specific information for extracting the LoD different for each layer using a G-PCC bitstream having a layered structure slice. The client device uses the partial slice-specific information included in the timed metadata to extract the partial slice corresponding to the LoD different for each layer from the G-PCC bitstream having the layered structure slice and causes the decoder to decode it. This makes it possible to display a three-dimensional image of a point cloud in which the LoD different for each layer is used from the G-PCC bitstream having the layered structure slice, using the timed metadata, providing the viewing experience that meets the viewer's request.

3. Third Embodiment

The description is now given of the third embodiment. The file creation device according to the present embodiment is different from the one of the first embodiment in that the LoD scalable coding is performed for the G-PCC still image. The file creation device according to the present embodiment is also represented by the block diagram in FIG. 8. In addition, the client device according to the present embodiment is also represented by the block diagrams in FIGS. 12 and 13. The description of the functions of the respective components similar to those of the first embodiment is omitted below. The configuration according to the present embodiment described below is also applicable to the layered structure slice.

FIG. 36 is a diagram illustrating a method of storing a G-PCC still image in an ISOBMFF file. The metadata generation unit 125 of the file creation device 100 according to the present embodiment stores a G-PCC still image in the ISOBMFF file using MetaBox, similar to the case where the case of storing the V-PCC still image defined in Non Patent Literature 4 in the ISOBMFF file, as illustrated in FIG. 36. In this case, the metadata generation unit 125 causes a parameter set such as SPS, GPS, APS, and tile inventory to be included in ItemProperty ('gpcC') arranged in a box 61.

Furthermore, the metadata generation unit 125 stores the partial slice-specific information in SubSampleItemProperty arranged in the box 61. FIG. 37 is a diagram illustrating an example of SubSampleItemProperty according to a third embodiment. The metadata generation unit 125 creates SubSampleItemProperty having syntax 62 illustrated in FIG. 37. In this case, the metadata generation unit 125 defines Codec_specific_parameters as in syntax 63 in FIG. 37. Here, SubSampleItemProperty includes information similar to that of SubSampleInformationBox in the first embodiment.

The data extraction unit 231 of the client device 200 parses the acquired ISOBMFF file to extract metadata. Then, the data extraction unit 231 extracts the partial slice corresponding to the specified LoD from the bitstream of a G-CC still image by using SubSampleItemProperty included in the metadata and outputs the partial slice to the decoding unit 222.

In the decoding unit 222, the geometry decoder 232 decodes a partial slice of the geometry slice 13 in the G-CC still image. In addition, in the decoding unit 222, the attribute decoder 233 decodes a partial slice of the attribute slice 14 in the G-CC still image.

The point cloud generation unit 234 of the display information generation unit 223 generates a point cloud using the decoded geometry data and attribute data. The image processing unit 235 performs rendering, generates a three-dimensional still image of the point cloud, and displays it on the display unit 202.

As described above, the file creation device according to the present embodiment stores the partial slice-specific information on the geometry slice and the attribute slice of the G-PCC still image in SubSamapleItemProperty. The client device uses SubSamapleItemProperty stored in the metadata acquired from the ISOBMFF file to extract a partial slice of the three-dimensional still image corresponding to the desired LoD and causes a decoder to decode the extracted partial slice to display a three-dimensional still image of point clouds. Thus, it is possible to decode the partial slice corresponding to the desired LoD included in the bitstream of the G-PCC still image can be decoded without depending on the decoder, providing the viewing experience that meets the viewer's requests even for the G-PCC still image.

3.1 Modification (1) of Third Embodiment

Figure 38:
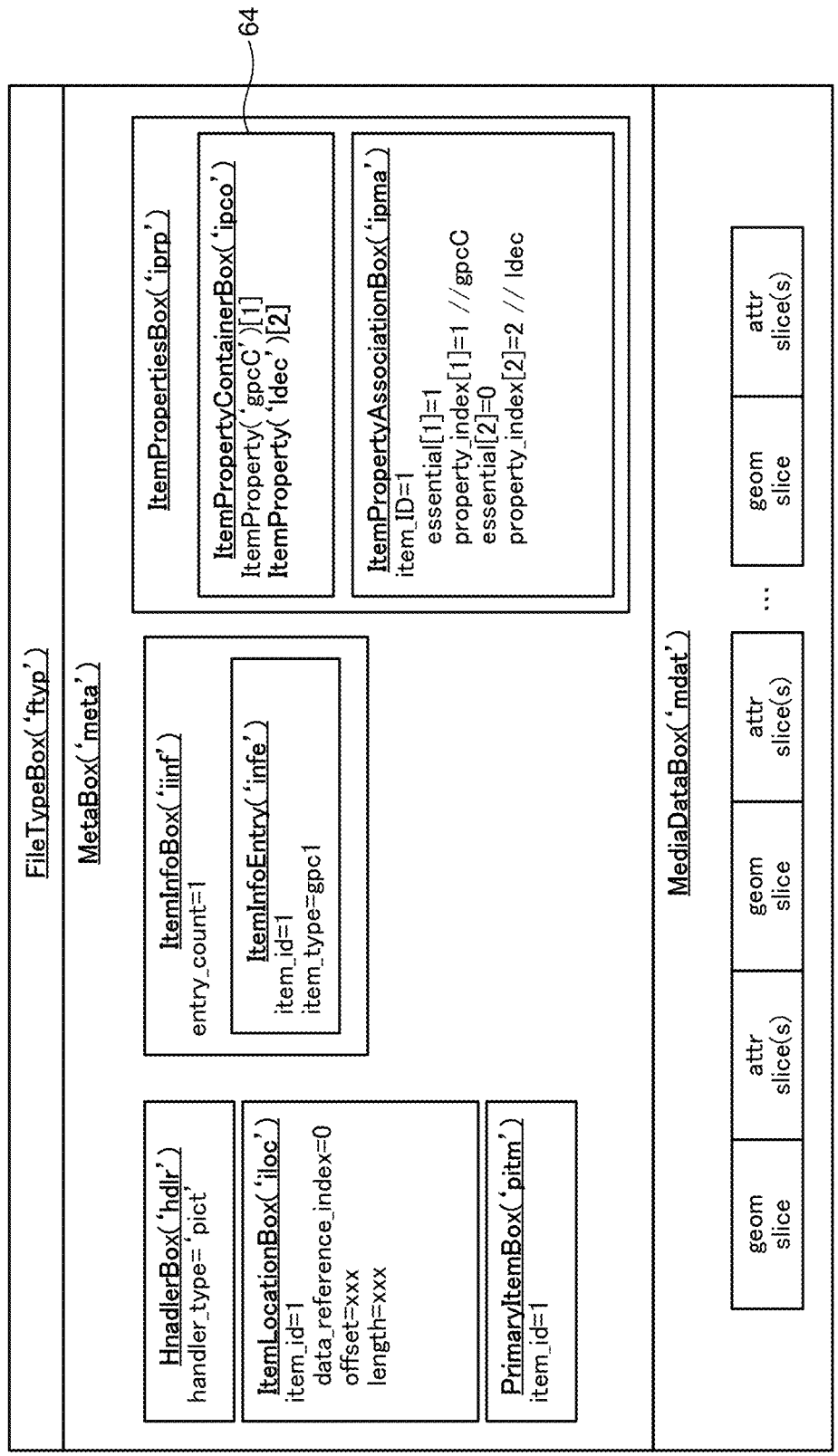
FIG. 38 is a diagram illustrating a storage method using timed metadata of a G-PCC still image.

The file creation device 100 according to the present modification differs from that of the third embodiment in that the partial slice-specific information used for obtaining the desired LoD is stored in the timed metadata, similar to Modification (2-1) of the first embodiment. The configuration according to the present modification described below is also applicable to the layered structure slice. FIG. 38 is a diagram illustrating a storage method using timed metadata of a G-PCC still image.

The metadata generation unit 125 according to the present modification newly defines and stores LoDDecodeItemProperty including partial slice-specific information in a box 64 illustrated in FIG. 38. For example, the metadata generation unit 125 generates LoDDecodeItemProperty as timed metadata 65 illustrated in the syntax in FIG. 39. FIG. 39 is a diagram illustrating exemplary timed metadata according to Modification (1) of the third embodiment. This LoDDecodeItemProperty includes information similar to the timed metadata 36 having the syntax in Modification (2-1) of the first embodiment illustrated in FIG. 18.

The data extraction unit 231 of the client device 200 parses the acquired ISOBMFF file to extract metadata. Then, the data extraction unit 231 specifies the decoding time corresponding to the LoD specified by using LoDDecodeItemProperty. Then, the data extraction unit 231 extracts the partial slice corresponding to the specified decoding time from the bitstream of the G-PCC still image.

As described above, the file creation device according to the present embodiment stores the partial slice-specific information in the timed metadata. The client device extracts the partial slice corresponding to the desired LoD by using the partial slice-specific information stored in the timed metadata. Thus, the client device is capable of setting the decoding position of the partial slice corresponding to the desired LoD from the timed metadata sample at the same time on the basis of the decoding time of the bitstream of the G-PCC still image, simplifying the processing of extracting partial slices.

3.2 Modification (2) of Third Embodiment

Figure 40:
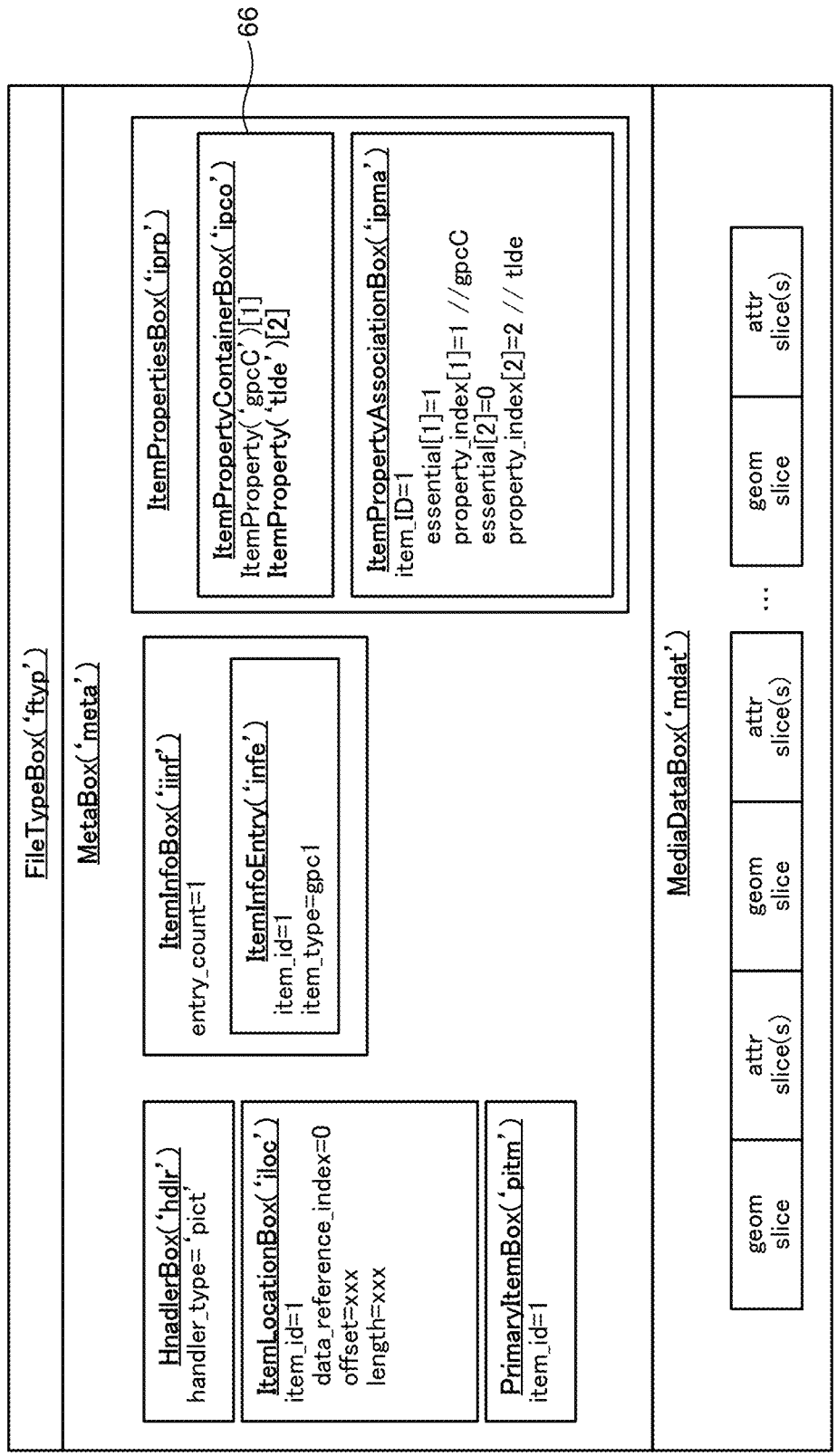
FIG. 40 is a diagram illustrating a method of storing partial slice-specific information in a case where a G-PCC still image has different types of LoD for each tile.

The file creation device according to the present modification differs from that of the third embodiment in that the LoD is different for each tile. The configuration according to the present modification described below is also applicable to the layered structure slice. FIG. 40 is a diagram illustrating a method of storing partial slice-specific information in a case where a G-PCC still image has different types of LoD for each tile.

The metadata generation unit 125 according to the present modification newly defines and stores TileLoDDocodeItemProperty including partial slice-specific information in a box 66 illustrated in FIG. 40. For example, the metadata generation unit 125 generates TileLoDDecodeItemProperty illustrated in the syntax 67 in FIG. 41. FIG. 41 is a diagram illustrating an example of TileLoDDecodeItemProperty according to Modification (2) of the third embodiment. This TileLoDDecodeItemProperty includes information similar to the timed metadata 52 in Modification (1) of the second embodiment illustrated in FIG. 30.

The data extraction unit 231 of the client device 200 specifies the decoding position of the partial slice corresponding to the high LoD specified by using the timed metadata for the geometry slice 13 and the attribute slice 14 included in the sample group specified to be decoded at the high LoD in the G-PCC still image. In addition, the data extraction unit 231 specifies the decoding position of the partial slice corresponding to the low LoD specified by using the timed metadata for the geometry slice 13 and the attribute slice 14 included in the sample group specified to be decoded at the low LoD in the G-PCC still image. Then, the data extraction unit 231 extracts the partial slice group corresponding to the specified decoding position. After that, the data extraction unit 231 outputs the extracted partial slice group corresponding to the high LoD and the extracted partial slice group corresponding to the low LoS for each sample group to the decoding unit 222 for decoding.

Moreover, the metadata generation unit 125 can also be configured to acquire tile information by referring to the tile inventory included in ItemProperty('gpcC').

As described above, the file creation device according to the present modification stores the partial slice-specific information on the geometry slice and the attribute slice grouped as a sample group for each tile of the G-PCC still image in the timed metadata. Then, the client device specifies the decoding position of the partial slice in the bitstream of the G-PCC still image corresponding to the specified LoD from the timed metadata according to the LoD for each specified subsample and extracts the partial slice from the geometry slice and the attribute slice. The client device according to the present modification is capable of setting the decoding position of the partial slice corresponding to the desired LoD for each sample from the timed metadata sample at the same time on the basis of the decoding time of the sample of the bitstream of the G-PCC still image. Thus, the client device according to the present modification is capable of displaying the LoD changed for each tile while simplifying the processing of extracting the partial slice from the bitstream of the G-PCC still image.

4. Fourth Embodiment

Figure 42:
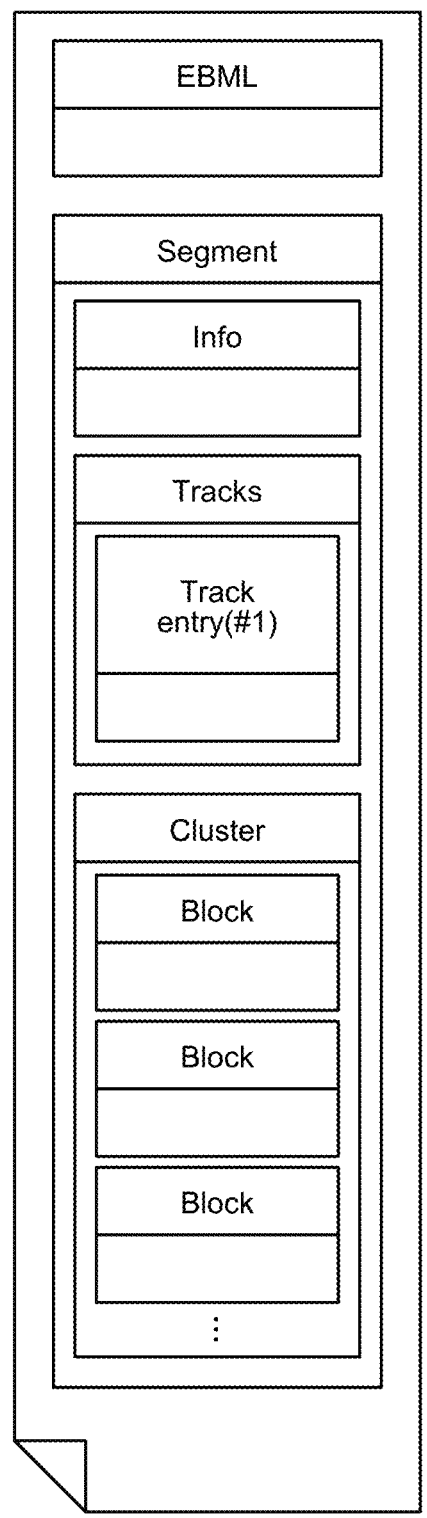
FIG. 42 is a diagram illustrating the format of the Matroska media container.

The description above is given of the case of storing in ISOBMFF. However, even when Matroska Media Container (http://www.matroska.org/) illustrated in FIG. 42 is used for transmission, it is possible to transmit metadata including the G-PCC bitstream 1 and the partial slice-specific information. FIG. 42 is a diagram illustrating the format of the Matroska media container.

In this case, the file creation unit 126 stores the information indicating the partial slice corresponding to each depth or the information used for associating with the partial slice information for each tile 11 in the newly defined element in the track entry element. In addition, the file creation unit 126 stores, in a track entry different from the track entry in which the G-PCC bitstream 1 is stored, the timed metadata in which the decoding position for obtaining the desired LoD is stored or the timed metadata in which the decoding position for obtaining the desired LoD is stored for each tile 11. In addition, for a bitstream of a G-PCC still image, the file creation unit 126 defines a new chunk using the extended file format of WebP and stores information similar to the information illustrated in the third embodiment and its modification.

At this time, the file creation unit 126 sets an element type as a binary and stores SceneDescriptionObjectMetadata( ) for EBML data as binary data.

[Hardware Configuration]

Figure 43:
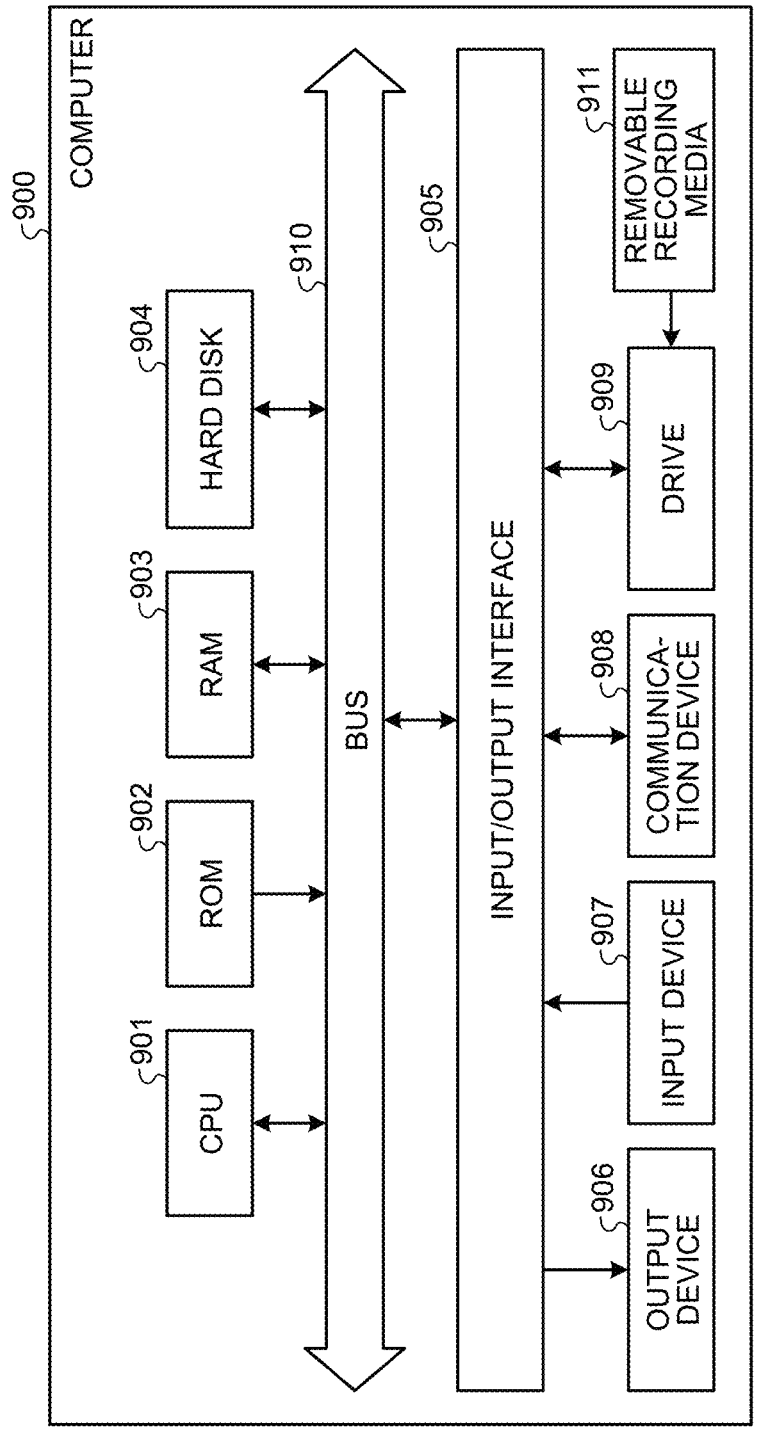
FIG. 43 is a diagram illustrating the hardware configuration of a computer.

FIG. 43 is a hardware configuration diagram of a computer. The file creation device 100 and the client device 200 are implementable as a computer 900 illustrated in FIG. 43. In the computer 900, a processor 901, a read-only memory (ROM) 902, a random-access memory (RAM) 903, a hard disk drive 904, and an input/output interface 905 are connected to each other via a bus 910.

The input/output interface 905 is connected with, for example, an output device 906, an input device 907, a communication device 908, and a drive 909. The output device 906 is, for example, a display, a speaker, an output terminal, or the like. The input device 907 is, for example, a keyboard, a mouse, a microphone, a touch panel, an input terminal, or the like. The drive 909 drives removable recording media 911 such as a magnetic disk, an optical disk, a magneto-optical disk, or a semiconductor memory.

The communication device 908 is connected to an external network. The file creation device 100 and the client device 200 are connected to each other via the communication device 908. In addition, the file creation device 100 and the client device 200 is connected to the web server 300 via the communication device 908. The hard disk drive 904 is non-volatile storage and an auxiliary storage device.

In the computer 900 configured as described above, the processor 901 loads and executes the program stored in the hard disk drive 904 into the RAM 903 via the bus 910, performing the series of processing operations in the respective embodiments and their modifications described above. The RAM 903 also appropriately stores data or the like necessary for the processor 901 to execute various types of processing.

The program executed by the processor 901 is recordable and applicable to, for example, removable recording media 911 as package media or the like. In such a case, the program can be installed on the hard disk drive 904 via the input/output interface 905 by mounting the removable recording media 911 on the drive 909.

Further, this program can also be provided via wired or wireless transmission media such as local area networks, the Internet, and digital satellite broadcasting. In such a case, the program can be received through the communication device 908 and installed on the hard disk drive 904.

In addition, this program can be installed in advance on the hard disk drive 904.

Although the description above is give of the embodiments of the present disclosure, the technical scope of the present disclosure is not limited to the above-described embodiments as they are, and various modifications and variations can be made without departing from the spirit and scope of the present disclosure. In addition, components covering different embodiments and modifications can be combined as appropriate.

Moreover, the effects described in the present specification are merely illustrative and are not restrictive, and other effects are achievable.

Note that the present technology may also include the following configuration.

(1)

An information processing apparatus comprising:

an encoding unit configured to encode point cloud data in such a way as to have a phased hierarchical structure corresponding to a level of detail (LoD) indicating a level of quality to generate a bitstream constituted of a data region including one or more geometry slices;

a metadata generation unit configured to generate partial slice-specific information for specifying a correspondence of the LoD to a partial slice used as a partial region corresponding to the LoD in the geometry slice; and a file creation unit configured to create a file including the partial slice-specific information.

(2)

The information processing apparatus according to (1), wherein the metadata generation unit extracts depth information indicating a depth in the hierarchical structure of layers constituting the LoD from the bitstream, and the metadata generation unit sets a portion of the geometry slice corresponding to the depth as a sub-sample.

(3)

The information processing apparatus according to (2), wherein the metadata generation unit further generates access information indicating access to each of the layers constituting the LoD.

(4)

The information processing apparatus according to (3), wherein the access information includes data size-related information about the sub-sample.

(5)

The information processing apparatus according to (4), wherein the file creation unit stores the partial slice-specific information and the access information in a sub-sample information box.

(6)

The information processing apparatus according to (5), wherein the metadata generation unit extracts information about a number of decoding points to be decoded for each of the layers as an amount of information, the number of decoding points being used as an index for selecting the depth depending on processing performance of a reproduction processing apparatus configured to reproduce three-dimensional content, and the file creation unit stores the amount of information in the file.

(7)

The information processing apparatus according to (6), wherein the partial slice-specific information includes the access information, and the metadata generation unit stores the partial slice-specific information in time-corresponding metadata.

(8)

The information processing apparatus according to (7), wherein the data size-related information includes identification information on the bitstream and data length-related information from a header of the bitstream.

(9)

The information processing apparatus according to (8), wherein the metadata generation unit extracts information about a number of decoding points to be decoded for each of the layers as an amount of information, the number of decoding points being used as an index for selecting the LoD depending on processing performance of a reproduction processing apparatus configured to reproduce the three-dimensional content, and the file creation unit stores the amount of information in the file.

(10)

The information processing apparatus according to (3), wherein the bitstream further includes an attribute slice indicating an additional attribute such as color and texture, and the access information includes type information indicating to be the sub-sample corresponding to the geometry slice or the attribute slice.

(11)

The information processing apparatus according to (3), wherein the point cloud data is data constituted of a plurality of tiles, the bitstream further includes an attribute slice indicating an additional attribute such as color and texture, and the metadata generation unit generates the partial slice-specific information corresponding to the LoD among a plurality of slices corresponding to the tile for each tile included in one frame of the bitstream.

(12)

The information processing apparatus according to (11), wherein the file creation unit associates the partial slice-specific information for each tile with a sub-sample information box including the partial slice-specific information.

(13)

The information processing apparatus according to (11), wherein the file creation unit stores the partial slice-specific information for each tile in time-corresponding metadata for each LoD information indicating the level of quality used as the hierarchical information.

(14)

The information processing apparatus according to (11), wherein the encoding unit generates the bitstream having a hierarchical unit divided for each layer, and the metadata generation unit generates the partial slice-specific information corresponding to the slice included in each of the hierarchical units.

(15)

The information processing apparatus according to (1), wherein the file creation unit stores a bitstream and partial slice-specific information with no temporal information in the file.

(16)

An information processing apparatus comprising:

an encoding unit configured to encode point cloud data in such a way as to have a phased hierarchical structure corresponding to LoD indicating a level of quality to generate a bitstream and depth information, the bitstream being constituted of a data region including one or more geometry slices and one or more attribute slices, the depth information indicating a depth in the hierarchical structure of layers constituting the LoD;

a metadata generation unit configured to generate partial slice-specific information for specifying a correspondence of the LoD to a partial slice used as a partial region corresponding to the LoD in the geometry slice and set a portion of the geometry slice corresponding to the depth as a sub-sample; and a file creation unit configured to create a file including the partial slice-specific information.

(17)

An information processing method causing a computer to execute processing comprising:

encoding point cloud data in such a way as to have a phased hierarchical structure corresponding to LoD indicating a level of quality to generate a bitstream constituted of a data region including one or more geometry slices;

generating partial slice-specific information for specifying a correspondence of the LoD to a partial slice used as a partial region corresponding to the LoD in the geometry slice; and creating a file including the partial slice-specific information.

(18)

A reproduction processing apparatus comprising:

a file acquisition unit configured to receive a file including a bitstream and partial slice-specific information, the bitstream being constituted of a data region including one or more geometry slices by encoding point cloud data in such a way as to have a phased hierarchical structure corresponding to LoD indicating a level of quality, the partial slice-specific information being used for specifying a correspondence of the LoD to a partial slice used as a partial region corresponding to the LoD in the geometry slice;

a data extraction unit configured to extract the partial slice-specific information from the file acquired by the file acquisition unit; and a decoding unit configured to decode the bitstream at a desired level of quality on a basis of the partial slice-specific information extracted by the data extraction unit.

(19)

A reproduction processing method causing a computer to execute processing comprising:

receiving a file including a bitstream and partial slice-specific information, the bitstream being constituted of a data region including one or more geometry slices by encoding point cloud data in such a way as to have a phased hierarchical structure corresponding to LoD indicating a level of quality, the partial slice-specific information being used for specifying a correspondence of the LoD to a partial slice used as a partial region corresponding to the LoD in the geometry slice;

extracting the partial slice-specific information from the acquired file; and decoding the bitstream at a desired level of quality on a basis of the extracted partial slice-specific information.

REFERENCE SIGNS LIST

1 G-PCC BITSTREAM
10 POINT CLOUD FRAME
11 TILE
12 SLICE
13 GEOMETRY SLICE
14 ATTRIBUTE SLICE
15 POINT
100 FILE CREATION DEVICE
101 EXTRACTION UNIT
102 FILE CREATION PROCESSING UNIT
103 TRANSMISSION UNIT
104 CONTROL UNIT
121 ENCODING UNIT
122 GEOMETRY ENCODER
123 ATTRIBUTE ENCODER
124 BITSTREAM GENERATION UNIT
125 METADATA GENERATION UNIT
126 FILE CREATION UNIT
200 CLIENT DEVICE
201 REPRODUCTION PROCESSING UNIT
202 DISPLAY UNIT
203 CONTROL UNIT
211 FILE ACQUISITION UNIT
212 DECODING PROCESSING UNIT
221 FILE PROCESSING UNIT
222 DECODING UNIT
223 DISPLAY INFORMATION GENERATION UNIT
231 DATA EXTRACTION UNIT
232 GEOMETRY DECODER
233 ATTRIBUTE DECODER
234 POINT CLOUD GENERATION UNIT
235 IMAGE PROCESSING UNIT
300 Web SERVER
400 NETWORK
500 DELIVERY SYSTEM

The invention claimed is:

1. An information processing apparatus comprising:
an encoder configured to encode point cloud data in such a way as to have a phased hierarchical structure corresponding to a level of detail (LoD) indicating a level of quality to generate a bitstream constituted of a data region including one or more geometry slices;
a metadata generator configured to
generate partial slice-specific information for specifying a correspondence of the LoD to a partial slice used as a partial region corresponding to the LoD in the geometry slice,
extract depth information indicating a depth in the hierarchical structure of layers constituting the LoD from the bitstream,
set a portion of the geometry slice corresponding to the depth as a sub-sample
generate access information indicating access to each of the layers constituting the LoD, wherein the access information includes data size-related information about the sub-sample; and
a file creator configured to create an International Organization for Standardization Base Media File Format (ISOBMFF) file including the partial slice-specific information, and store the partial slice-specific information and the access information in a sub-sample information box.

2. The information processing apparatus according to claim 1, wherein
the metadata generator extracts information about a number of decoding points to be decoded for each of the layers as an amount of information, the number of decoding points being used as an index for selecting the depth depending on processing performance of a reproduction processing apparatus configured to reproduce three- dimensional content, and
the file creator stores the amount of information in the ISOBMFF file.

3. The information processing apparatus according to claim 2, wherein the partial slice-specific information includes the access information, and the metadata generator stores the partial slice-specific information in time-corresponding metadata.

4. The information processing apparatus according to claim 3, wherein the data size-related information includes identification information on the bitstream and data length-related information from a header of the bitstream.

5. The information processing apparatus according to claim 4, wherein the metadata generator extracts information about a number of decoding points to be decoded for each of the layers as an amount of information, the number of decoding points being used as an index for selecting the LoD depending on processing performance of a reproduction processing apparatus configured to reproduce the three-dimensional content, and the file creator stores the amount of information in the ISOBMFF file.

6. The information processing apparatus according to claim 1,
wherein
the bitstream further includes an attribute slice indicating an additional attribute such as color and texture, and
the access information includes type information indicating to be the sub-sample corresponding to the geometry slice or the attribute slice.

7. The information processing apparatus according to claim 1,
wherein
the point cloud data is data constituted of a plurality of tiles,
the bitstream further includes an attribute slice indicating an additional attribute such as color and texture, and the metadata generator generates the partial slice-specific information corresponding to the LoD among a plurality of slices corresponding to the tile for each tile included in one frame of the bitstream.

8. The information processing apparatus according to claim 7, wherein the file creator associates the partial slice-specific information for each tile with a sub-sample information box including the partial slice-specific information.

9. The information processing apparatus according to claim 7, wherein the file creator stores the partial slice-specific information for each tile in time-corresponding metadata for each LoD information indicating the level of quality used as the hierarchical information.

10. The information processing apparatus according to claim 7,
wherein the encoder generates the bitstream having a hierarchical portion divided for each layer, and
the metadata generator generates the partial slice-specific information corresponding to the slice included in each of the hierarchical portions.

11. The information processing apparatus according to claim 1,
wherein the file creator stores a bitstream and partial slice-specific information with no temporal information in the ISOBMFF file.

12. An information processing apparatus comprising:
an encoder configured to encode point cloud data in such a way as to have a phased hierarchical structure corresponding to level of detail (LoD) indicating a level of quality to generate a bitstream and depth information, the bitstream being constituted of a data region including one or more geometry slices and one or more attribute slices, the depth information indicating a depth in the hierarchical structure of layers constituting the LoD;
a metadata generator configured to generate partial slice-specific information for specifying a correspondence of the LoD to a partial slice used as a partial region corresponding to the LoD in the geometry slice,
extract the depth information indicating the depth in the hierarchical structure of layers constituting the LoD from the bitstream,
set a portion of the geometry slice corresponding to the depth as a sub-sample,
generate access information indicating access to each of the layers constituting the LoD,
wherein the access information includes data size-related information about the sub-sample; and
a file creator configured to create an International Organization for Standardization Base Media File Format (ISOBMFF) file including the partial slice-specific information, and store the partial slice-specific information and the access information in a sub-sample information box.

13. An information processing method causing a computer to execute processing comprising:
encoding point cloud data in such a way as to have a phased hierarchical structure corresponding to level of detail (LoD) indicating a level of quality to generate a bitstream constituted of a data region including one or more geometry slices;
generating partial slice-specific information for specifying a correspondence of the LoD to a partial slice used as a partial region corresponding to the LoD in the geometry slice;
extracting depth information indicating a depth in the hierarchical structure of layers constituting the LoD from the bitstream;
setting a portion of the geometry slice corresponding to the depth as a sub-sample; generating access information indicating access to each of the layers constituting the LoD, wherein the access information includes data size-related information about the sub-sample;
creating an International Organization for Standardization Base Media File Format (ISOBMFF) file including the partial slice-specific information; and
storing the partial slice-specific information and the access information in a sub-sample information box.

14. A reproduction processing apparatus comprising:
a file acquirer configured to receive an International Organization for Standardization Base Media File Format (ISOBMFF) file including a bitstream and partial slice-specific information, the bitstream being constituted of a data region including one or more geometry slices by encoding point cloud data in such a way as to have a phased hierarchical structure corresponding to level of detail (LoD) indicating a level of quality, the partial slice-specific information being used for specifying a correspondence of the LoD to a partial slice used as a partial region corresponding to the LoD in the geometry slice;
a data extractor configured to extract the partial slice-specific information from the ISOBMFF file acquired by the file acquirer; and
a decoder configured to decode the bitstream at a desired level of quality on a basis of the partial slice-specific information extracted by the data extractor, wherein the partial slice-specific information and access information is stored in a sub-sample information box, wherein the access information includes data size-related information about a sub-sample.

15. A reproduction processing method causing a computer to execute processing comprising:

receiving an International Organization for Standardization Base Media File Format (ISOBMFF) file including a bitstream and partial slice-specific information, the bitstream being constituted of a data region including one or more geometry slices by encoding point cloud data in such a way as to have a phased hierarchical structure corresponding to level of detail (LoD) indicating a level of quality, the partial slice-specific information being used for specifying a correspondence of the LoD to a partial slice used as a partial region corresponding to the LoD in the geometry slice;

extracting the partial slice-specific information from the acquired ISOBMFF file; and decoding the bitstream at a desired level of quality on a basis of the extracted partial slice-specific information, wherein the partial slice-specific information and access information is stored in a sub-sample information box, wherein the access information includes data size-related information about a sub-sample.

* * * * *